(12) United States Patent
Reznek et al.

(10) Patent No.: US 12,051,114 B2
(45) Date of Patent: Jul. 30, 2024

(54) COMPUTER VISION METHODS FOR LOSS PREDICTION AND ASSET EVALUATION BASED ON AERIAL IMAGES

(71) Applicant: Allstate Insurance Company, Northbrook, IL (US)

(72) Inventors: Deborah-Anna Reznek, Redwood City, CA (US); Adam Sturt, Chicago, IL (US); Jeremy Werner, Oak Park, IL (US); Adam Austin, Wheaton, IL (US); Amber Parsons, Bothell, WA (US); Xiaolan Wu, Sunnyvale, CA (US); Ryan Rosenberg, Palo Alto, CA (US); Lizette Lemus Gonzalez, Bothell, WA (US); Weizhou Wang, Redwood City, CA (US); Stephanie Wong, Chicago, IL (US); Charles Cox, Seattle, WA (US); Jean Utke, Lisle, IL (US); Yusuf Mansour, Bothell, WA (US); Tia Miceli, Aurora, IL (US); Lakshmi Prabha Nattamai Sekar, Aurora, IL (US); Meg G. Walters, Chicago, IL (US); Dylan Stark, Arlington Heights, IL (US); Emily Pavey, Chicago, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 17/220,091

(22) Filed: Apr. 1, 2021

(65) Prior Publication Data
US 2022/0318916 A1 Oct. 6, 2022

(51) Int. Cl.
*G06Q 40/00* (2023.01)
*G06F 18/214* (2023.01)
(Continued)

(52) U.S. Cl.
CPC .......... *G06Q 40/08* (2013.01); *G06F 18/214* (2023.01); *G06Q 10/10* (2013.01); *G06Q 30/0283* (2013.01); *G06V 20/17* (2022.01)

(58) Field of Classification Search
CPC .... G06Q 40/08; G06Q 10/10; G06Q 30/0283; G06V 20/13; G06K 9/6256
See application file for complete search history.

(56) References Cited

U.S. PATENT DOCUMENTS

| | | |
|---|---|---|
| 5,479,587 A | 12/1995 | Campbell |
| 8,078,436 B2 | 12/2011 | Pershing et al. |
| | (Continued) | |

OTHER PUBLICATIONS

"IRIS Aerial imagery analytics" Athenium Analytics https://www.athenium.com/products/iris/ website visited Oct. 13, 2020, pp. 1-15.
(Continued)

*Primary Examiner* — Rajesh Khattar
(74) *Attorney, Agent, or Firm* — Dinsmore & Shohl LLP

(57) ABSTRACT

Aspects of the disclosure relate to using computer vision methods to forecast damage. A computing platform may receive historical images comprising aerial images of residential properties and historical loss data corresponding to the residential properties. Using the historical images and the historical loss data, the computing platform may train a computer vision model, which may configure the computer vision model to output loss prediction information directly from an image. The computing platform may receive a new image corresponding to a particular residential property, and may analyze the new image, using the computer vision model, which may directly result in a likelihood of damage score. Based on the likelihood of damage score, the computing platform may send likelihood of damage information and one or more commands directing a user device to display the likelihood of damage information, which may (Continued)

cause the user device to display the likelihood of damage information.

19 Claims, 20 Drawing Sheets

(51) Int. Cl.
*G06Q 10/10* (2023.01)
*G06Q 30/0283* (2023.01)
*G06Q 40/08* (2012.01)
*G06V 20/17* (2022.01)

(56) References Cited

U.S. PATENT DOCUMENTS

| | | |
|---|---|---|
| 8,289,160 B1 | 10/2012 | Billman |
| 9,536,148 B2 | 1/2017 | Gross |
| 9,613,538 B1 | 4/2017 | Poole et al. |
| 9,846,915 B2 | 12/2017 | Howe et al. |
| 9,894,327 B1 | 2/2018 | Jacob |
| 10,007,992 B1 | 6/2018 | Harvey et al. |
| 10,102,586 B1 | 10/2018 | Marlow et al. |
| 10,137,984 B1 | 11/2018 | Flick |
| 10,217,207 B2 | 2/2019 | Marra et al. |
| 10,503,842 B2 | 12/2019 | Loveland et al. |
| 10,511,676 B2 | 12/2019 | Howe et al. |
| 10,529,026 B2 | 1/2020 | Lekas |
| 10,650,285 B1 | 5/2020 | Okazaki |
| 10,755,357 B1 | 8/2020 | Davis et al. |
| 10,762,795 B2 | 9/2020 | Contreras et al. |
| 11,080,838 B1 | 8/2021 | Li |
| 11,430,180 B2 | 8/2022 | Floyd |
| 11,748,664 B1 | 9/2023 | Mazumder |
| 11,768,994 B1 | 9/2023 | Reddy |
| 11,769,146 B1 | 9/2023 | Houseworth |
| 2009/0265193 A1 | 10/2009 | Collins et al. |
| 2014/0032247 A1* | 1/2014 | Robinson ............... G06Q 10/10 705/4 |
| 2015/0317740 A1 | 11/2015 | Emison et al. |
| 2016/0307447 A1 | 10/2016 | Johnson |
| 2017/0199647 A1 | 7/2017 | Richman |
| 2017/0345069 A1 | 11/2017 | Abrie et al. |
| 2019/0304026 A1 | 10/2019 | Lyman et al. |
| 2020/0082168 A1 | 3/2020 | Fathi |
| 2022/0318980 A1 | 10/2022 | Reznek |
| 2023/0298155 A1 | 9/2023 | Nishiuchi |

OTHER PUBLICATIONS

Joseph Xu et al. "Machine Learning-based Damage Assessment for Disaster Relief" Google AI Blog https://ai.googleblog.com/2020/06/machine-learning-based-damage.html Jun. 16, 2020, pp. 1-5.

"Damage Assessment (Drones)" Nanonets https://nanonets.com/model/drones-damage-assessment website visited Oct. 13, 2020, pp. 1-7.

International Search Report and Written Opinion for PCT/US2022/022351 issued Oct. 3, 2023, 6 pages.

Non-Final Rejection for U.S. Appl. No. 17/220,161 dated Oct. 5, 2023, 10 pages.

* cited by examiner

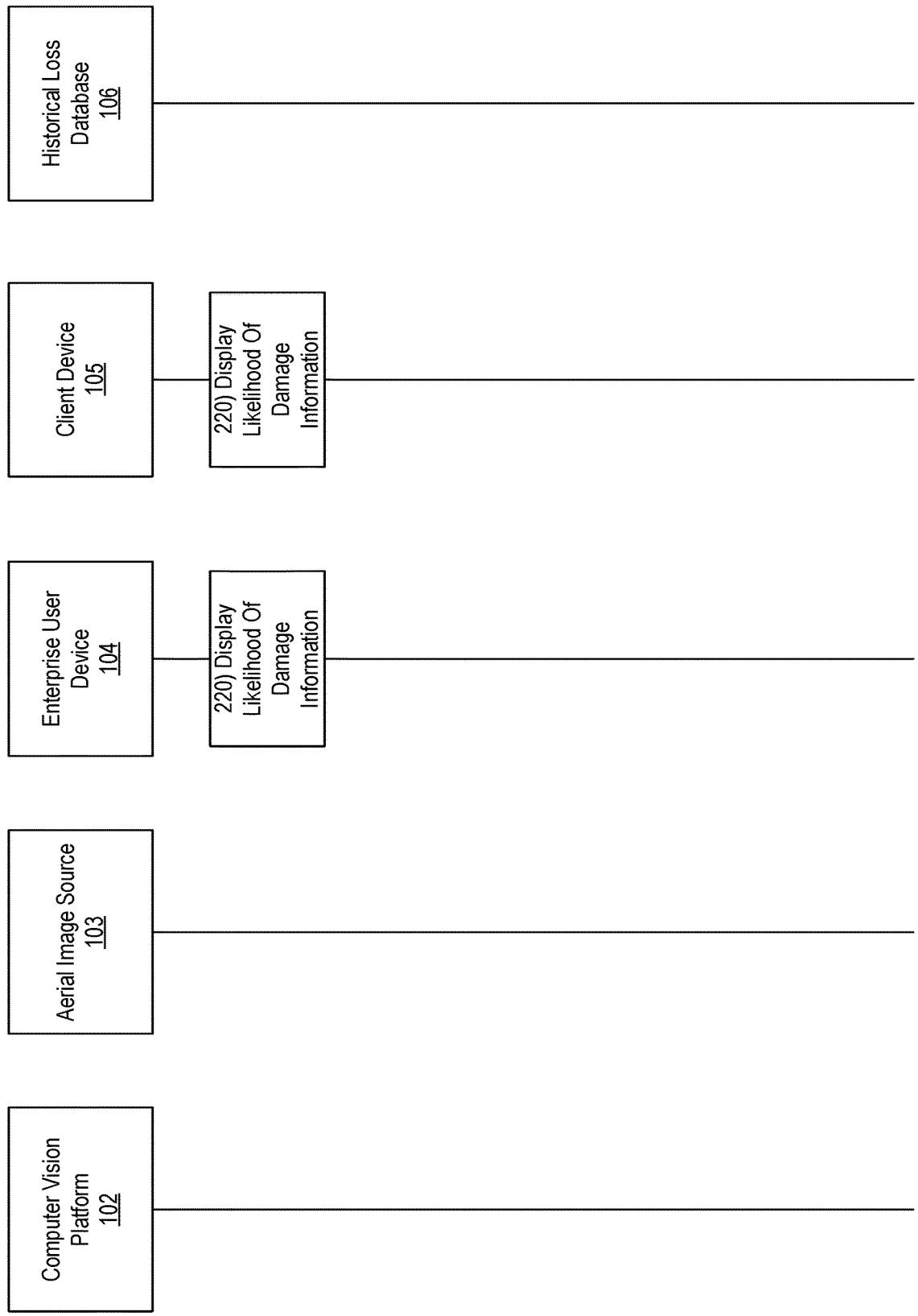

405

Predictive Damage Interface

Our analysis indicates the following damages risks:

Fire damage: 5%
Tornado damage: 1%
Flood damage: 5%
Wind damage: 3%
Hail damage: 1%
Overall: 3%

Predictive Damage Interface

Based on our predictive damage analysis, we recommend the following homeowner's premium:

$1000

Contact Homeowner

FIG. 5

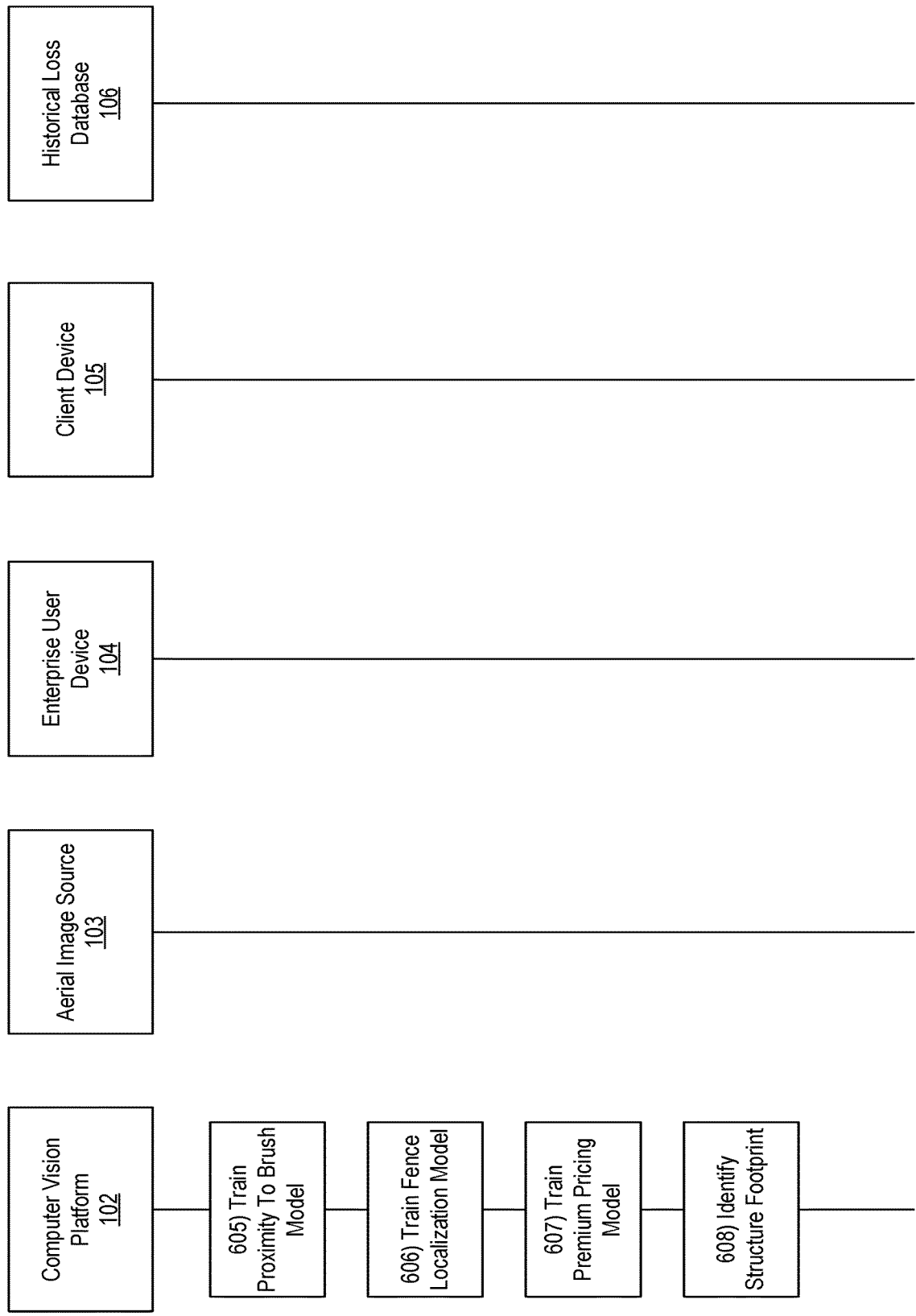

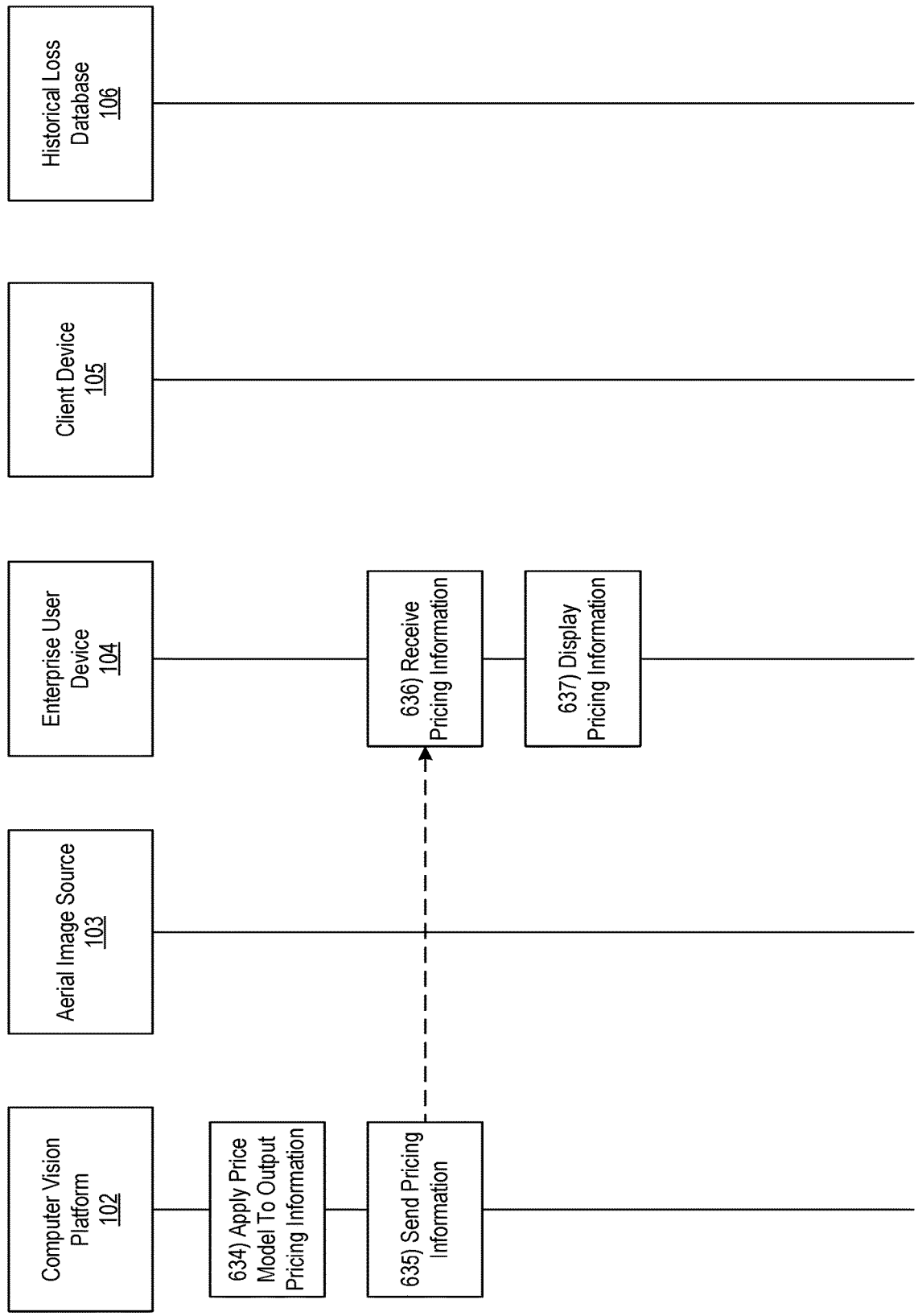

805

Inspection Interface

Based on automated analysis, this home will not pass inspection. There is no need to conduct the physical inspection. Click below to send results to the client.

Contact Homeowner

Replacement Cost Interface

Based on automated analysis, the roof for this home will cost $10,000 to repair. Click below to send results to the client.

Contact Homeowner

Square Footage Interface

Based on automated analysis, this home is 5,643 square feet.

Likelihood of Fire Damage

Based on automated analysis, there is a 5% likelihood of fire damage due to brush encroaching by this home. Click below to send results to the client.

Contact Homeowner

Likelihood of Injury

Based on automated analysis, there is a 5% likelihood of injury due to the location of a fence on this property. Click below to send results to the client.

Contact Homeowner

Pricing Interface

Based on a comprehensive automated analysis of this property, a premium of $1000 is recommended. Click below to contact the homeowner.

Contact Homeowner

FIG. 13

COMPUTER VISION METHODS FOR LOSS PREDICTION AND ASSET EVALUATION BASED ON AERIAL IMAGES

BACKGROUND

Aspects of the disclosure relate to processing systems. In particular, aspects of the disclosure relate to processing systems that train and apply computer vision methods.

In some instances, enterprise organizations may solicit customer information to compute or otherwise identify a likelihood of property damage. In these instances, however, it may be time consuming for customers to input such information, which may result in a negative customer experience and furthermore may result in delayed processing capabilities. Furthermore, by prompting for such manual input, enterprise organizations may receive error prone data (e.g., due to human error), which may result in inaccuracies once the information is processed to identify the likelihood of property damage.

SUMMARY

Aspects of the disclosure provide effective, efficient, scalable, and convenient technical solutions that address and overcome the technical problems associated with damage prediction and asset evaluation.

In accordance with one or more embodiments, a computing platform comprising at least one processor, a communication interface communicatively coupled to the at least one processor, and memory may receive, from a first data source, historical images comprising aerial images of a plurality of residential properties. The computing platform may receive, from a second data source, historical loss data indicating historical damage corresponding to one or more of the plurality of residential properties. Using the historical images and the historical loss data, the computing platform may train a computer vision model, which may configure the computer vision model to output loss prediction information directly from an image. The computing platform may receive, from the first data source, a new image corresponding to a particular residential property. Using the computer vision model, the computing platform may analyze the new image, which may result in output of a likelihood of damage score. The computing platform may send, to an enterprise user device, likelihood of damage information based on the likelihood of damage score, and one or more commands directing the enterprise user device to display the likelihood of damage information, which may cause the enterprise user device to display the likelihood of damage information.

In one or more instances, the particular residential property might not be one of the plurality of residential properties. In one or more instances, the computing platform may analyze the new image using a holistic method. In one or more instances, the computing platform may train the computer vision model by establishing relationships between each historical image and the historical loss data for the corresponding historical image.

In one or more examples, the historical images may be top down images, oblique images, color spectrum images, and near infrared images. In one or more instances, the computing platform may analyze the new image using the computer vision model by identifying, based on foliage detected in the new image, the likelihood of damage score.

In one or more arrangements, the likelihood of damage score may indicate a likelihood of future damage to the particular residential property. In one or more instances, the computing platform may analyze the new image using computer vision methods and without comparing the new image to the plurality of historical images.

In one or more instances, using the new image, the computing platform may identify metadata corresponding to the new image, which may include one or more of: a geolocation corresponding to the particular residential property or a time at which the new image was captured. In these instances, the computing platform may analyze the new image in context of the metadata.

In one or more example arrangements, the computer vision model may include: a likelihood of fire damage sub-model, a likelihood of tornado damage sub-model, a likelihood of flood damage sub-model, a likelihood of wind damage sub-model, and a likelihood of hail damage sub-model, and the computing platform may apply each of these sub-models in applying the computer vision model. In one or more instances, the likelihood of damage score may be a composite score based on an output from each of the likelihood of fire damage sub-model, the likelihood of tornado damage sub-model, the likelihood of flood damage sub-model, the likelihood of wind damage sub-model, and the likelihood of hail damage sub-model.

In accordance with one or more additional embodiments, a computing platform comprising at least one processor, a communication interface communicatively coupled to the at least one processor, and memory may receive, from a first data source, historical images comprising aerial images of a plurality of residential properties. The computing platform may receive, from a second data source, historical inspection data indicating historical inspection results corresponding to one or more of the plurality of residential properties. Using the historical images and the historical inspection data, the computing platform may train a roof waiver model (which may be a computer vision model), which may configure the roof waiver model to output inspection prediction information directly from an image. The computing platform may receive, from the first data source, a new image corresponding to a particular residential property. Using the roof waiver model, the computing platform may analyze the new image, which may directly result in output of a likelihood of passing inspection. The computing platform may send, to an enterprise user device and based on the likelihood of passing inspection, inspection information indicating whether or not a physical inspection should be performed and one or more commands directing the enterprise user device to display the inspection information, which may cause the enterprise user device to display the inspection information.

In one or more instances, the likelihood of passing inspection may indicate a likelihood of a roof corresponding to the new image passing a roof inspection. In one or more instances, the computing platform may compare the likelihood of passing inspection to a roof inspection threshold. In these instances, in response to identifying that the likelihood of passing inspection exceeds the roof inspection threshold, the computing platform may generate the inspection information, which may indicate that a physical roof inspection should be conducted. Further, in these instances, in response to identifying that the likelihood of passing inspection does not exceed the roof inspection threshold, the computing platform may generate the inspection information, which may indicate that the physical roof inspection should not be conducted.

In one or more example arrangements, the computing platform may analyze the new image without comparing the new image to the historical images. In one or more instances, the particular residential property might not be one of the plurality of residential properties.

In one or more instances, the computing platform may train the roof waiver model by establishing relationships between each historical image and the historical inspection data for the corresponding historical image. In one or more instances, the computing platform may train, using the historical images, a roof obscured by trees model (which may be a computer vision model), which may configure the roof obscured by trees model to output tree obstruction information directly from an image. The computing platform may analyze, using the roof obscured by trees model and a building footprint corresponding to a structure in the new image, the new image, which may directly result in output of roof obstruction information indicating a portion of a roof of the structure that is obstructed by trees. The computing platform may compare the roof obstruction information to a roof obstruction threshold, and may analyze the new image using the roof waiver model in response to identifying that the roof obstruction information exceeds the roof obstruction threshold.

In one or more instances, the computing platform may train, using the historical images, a roof facets model (which may be a computer vision model), which may configure the roof facets model to output roof facets information directly from an image. The computing platform may analyze, using the roof facets model, the new image, which may directly result in output of a roof complexity score. The computing platform may identify, using the roof facets model and based on the roof complexity score, roof replacement cost information indicating a cost to replace a roof of a structure corresponding to the new image based on complexity of the roof. The computing platform may send, to the enterprise user device, the roof replacement cost information and one or more commands directing the enterprise user device to display the roof replacement cost information, which may cause the enterprise user device to display the roof replacement cost information.

In one or more examples, the computing platform may train, using the historical images, a roof square footage model (which may be a computer vision model), which may configure the roof square footage model to output square footage information directly from an image. The computing platform may analyze, using the roof square footage model, the new image, which may directly result in output of square footage information for a structure corresponding to the new image. The computing platform may send, to the enterprise user device, the square footage information and one or more commands directing the enterprise user device to display the square footage information, which may cause the enterprise user device to display the square footage information.

In one or more instances, the computing platform may train, using the historical images, a proximity to brush model (which may be a computer vision model), which may configure the proximity to brush model to output likelihood of fire damage information, indicating a likelihood of fire damage caused by proximity of flammable brush, directly from an image. The computing platform may analyze, using the proximity to brush model, the new image, which may directly result in output of likelihood of fire damage information for a structure corresponding to the new image. The computing platform may send, to the enterprise user device, the likelihood of fire damage and one or more commands directing the enterprise user device to display the likelihood of fire damage information, which may cause the enterprise user device to display the likelihood of fire damage information.

In one or more arrangements, the computing platform may train, using the historical images, a fence localization model (which may be a computer vision model), which may configure the fence localization model to output fence localization information, indicating a likelihood of injury due to fence locations on a property corresponding to an image, directly from an image. Using the fence localization model, the computing platform may analyze, using the fence localization model, the new image, which may directly result in output of likelihood of injury information for the particular residential property. In one or more instances, the computing platform may send, to the enterprise user device, the likelihood of injury information and one or more commands directing the enterprise user device to display the likelihood of injury information, which may cause the enterprise user device to display the likelihood of injury information.

In one or more instances, the computing platform may train, using the historical images and historical loss data, a direct loss model (which may be a computer vision model), which may configure the direct loss model to output loss prediction information, indicating a likelihood of damage to a structure, directly from an image. The computing platform may analyze, using the direct loss model, the new image, which may directly result in output of a likelihood of damage score. The computing platform may send, to the enterprise user device, likelihood of damage information, based on the likelihood of damage score, and one or more commands directing the enterprise user device to display the likelihood of damage information, which may cause the enterprise user device to display the likelihood of damage information.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2D depict an illustrative event sequence for applying computer vision methods for likelihood of damage prediction in accordance with one or more example embodiments;

FIGS. 4 and 5 depict illustrative graphical user interfaces for applying computer vision methods for likelihood of damage prediction in accordance with one or more example embodiments;

FIGS. 6A-6H depict an illustrative event sequence for applying computer vision methods for asset evaluation in accordance with one or more example embodiments;

FIGS. 8-13 depict illustrative graphical user interfaces for applying computer vision methods for asset evaluation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further below, systems and methods for predicting property damage using computer vision models are described. For example, a risk profile of an asset may be identified based on aerial photographs. A system may localize and classify the objects in aerial photographs to determine a risk profile of an asset. The system may preprocess the aerial images to account for shadows, distances between the asset and an image capture device, and/or other noise from aerial photographs (e.g., top down images, oblique images, color spectrum images, infrared images, and/or other images). In doing so, technical solutions to technical problems may be provided. For example, it may take a considerable amount of computing power and time to obtain information for an asset (e.g., a property) that may be used to determine an accurate policy price. Accordingly, by obtaining such information directly from an image (e.g., rather than prompting a customer to input information), the client experience may be improved. Furthermore, by applying computer vision models to identify likelihood of damage directly from an image (e.g., rather than providing a list of answers based on the image, and then using these answers to identify a risk of loss), the methods described may perform a holistic analysis that may reduce processing power used to predict likelihood of damage.

Figure 1A:
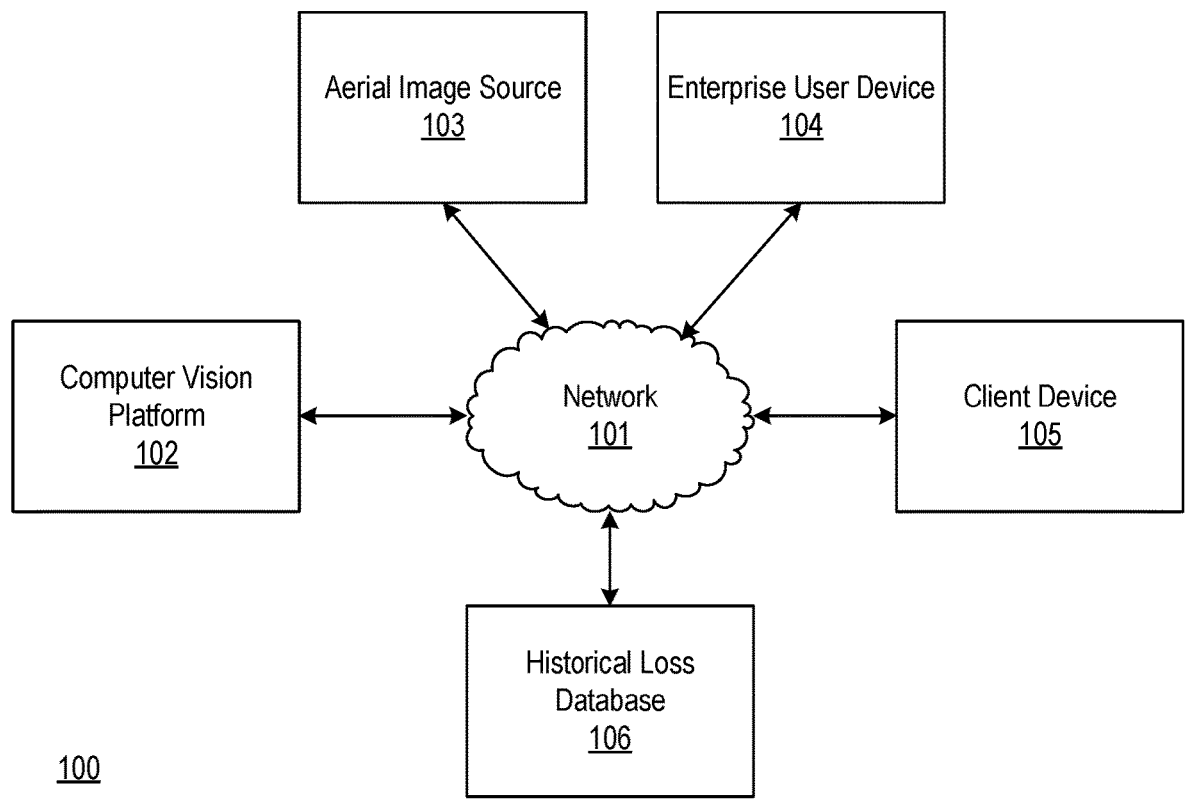
FIGS. 1A and 1B depict an illustrative computing environment for applying computer vision methods for likelihood of damage prediction in accordance with one or more example embodiments.
Figure 1B:
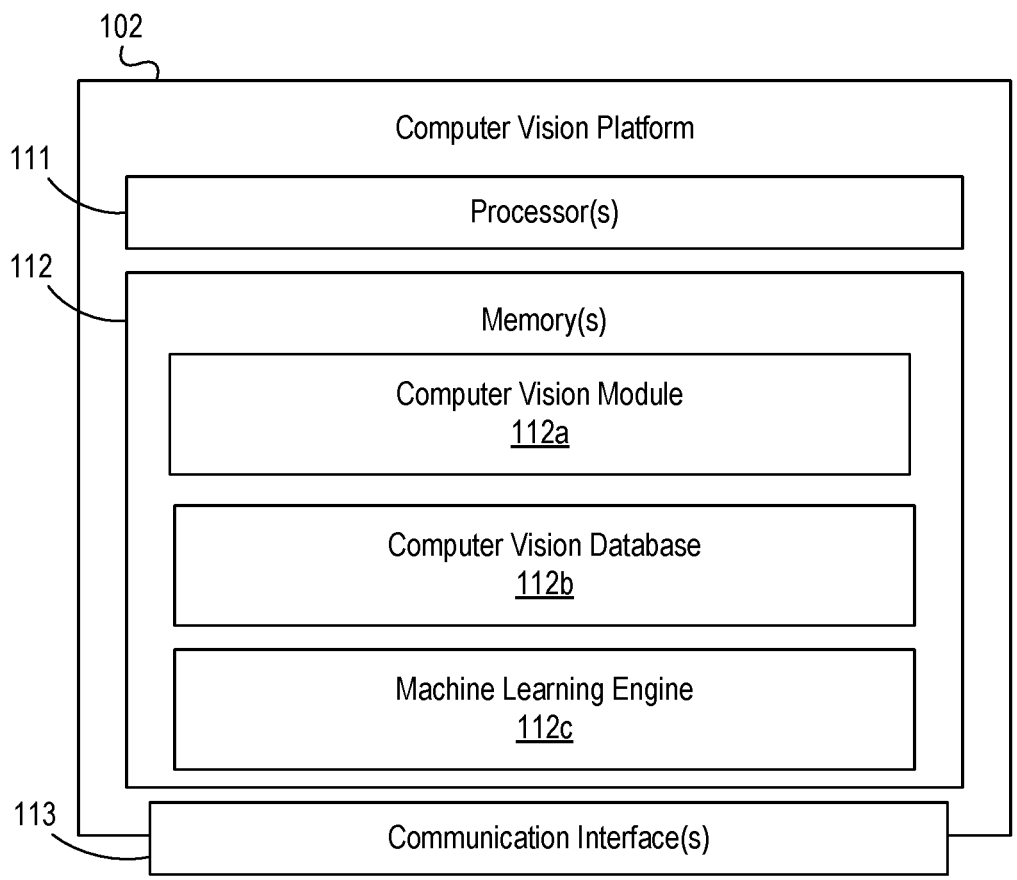

FIGS. 1A and 1B depict an illustrative computing environment for applying computer vision methods for likelihood of damage prediction in accordance with one or more example embodiments. Referring to FIG. 1A, computing environment 100 may include one or more computer systems. For example, computing environment 100 may include computer vision platform 102, aerial image source 103, enterprise user device 104, client device 105, and historical loss database 106.

As illustrated in greater detail below, computer vision platform 102 may include one or more computing devices configured to perform one or more of the functions described herein. For example, computer vision platform 102 may include one or more computers (e.g., laptop computers, desktop computers, servers, server blades, or the like) and/or other computer components (e.g., processors, memories, communication interfaces). In addition, and as illustrated in greater detail below, computer vision platform 102 may be configured to apply one or more computer vision methods to predict damage to an asset (e.g., a property) based on one or more images corresponding to the property, and to identify premiums for the property based on the predicted damage.

Aerial image source 103 may be or include one or more computing devices (e.g., servers, server blades, and/or other devices) configured to store historical and current images (which may e.g., be captured in an aerial manner) for a plurality of assets (e.g., properties). For example, aerial image source 103 may be configured to store top down images, oblique images, color spectrum images, near infrared images, and/or other images of commercial and/or residential properties.

Enterprise user device 104 may be a computing device (e.g., smartphone, tablet, desktop computer, laptop computer, or other personal computing device) that may be used by an enterprise user (e.g., a representative or other employee at an enterprise organization, such as an insurance provider). In some instances, the enterprise user device 104 may be used to identify premiums and/or provide other services to clients of the enterprise organization (e.g., a user operating client device 105).

Client device 105 may be a computing device (e.g., smartphone, tablet, desktop computer, laptop computer, or other personal computing device) that may be used by a client (e.g., a current or prospective client of an enterprise organization such as an insurance institution). In some instances, the client device 105 may be configured to display one or more graphical user interfaces (e.g., graphical user interfaces that include premiums, predicted loss information, and/or other information from the enterprise organization).

Historic loss database 106 may include one or more computers (e.g., laptop computers, desktop computers, servers, server blades, or the like) and/or other computer components (e.g., processors, memories, communication interfaces). In some instances, historic loss database 106 may be configured to store and provide claims data for clients of an enterprise organization corresponding to the computer vision platform 102 (e.g., an insurance institution). For example, the historical loss database 106 may store information indicating historical damage to various assets (e.g., properties).

Computing environment 100 also may include one or more networks, which may interconnect one or more of computer vision platform 102, aerial image source 103, enterprise user device 104, client device 105, historical loss database 106, and/or one or more other systems, public networks, sub-networks, and/or the like. For example, computing environment 100 may include a network 101.

In one or more arrangements, computer vision platform 102, aerial image source 103, enterprise user device 104, client device 105, historical loss database 106, and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of computer vision platform 102, aerial image source 103, enterprise user device 104, client device 105, and/or historical loss database 106 may, in some instances, be special-purpose computing devices configured to perform specific functions.

Referring to FIG. 1B, computer vision platform 102 may include one or more processors 111, memory 112, and communication interface 113. A data bus may interconnect processor 111, memory 112, and communication interface 113. Communication interface 113 may be a network interface configured to support communication between computer vision platform 102 and one or more networks (e.g., network 101, or the like). Memory 112 may include one or more program modules having instructions that when executed by processor 111 cause computer vision platform 102 to perform one or more functions described herein and/or one or more databases that may store and/or otherwise maintain information which may be used by such program modules and/or processor 111. In some instances, the one or more program modules and/or databases may be stored by and/or maintained in different memory units of computer vision platform 102 and/or by different computing devices that may form and/or otherwise make up computer vision platform 102. For example, memory 112 may have, store, and/or include a computer vision module 112a, a computer vision database 112b, and a machine learning engine 112c. Computer vision module 112a may have instructions that direct and/or cause computer vision platform 102 to analyze images to predict likelihood of damage, as discussed in greater detail herein. Computer vision database 112b may store information (e.g., historical images, historical loss information, or the like) used by computer vision module 112a and/or computer vision platform 102 in analyzing images to predict likelihood of damage and/or in performing other functions. Machine learning engine 112c may have instructions that direct and/or cause the computer vision platform 102 to predict likelihood of damage, based on images, and to set, define, and/or iteratively refine optimization rules, techniques and/or other parameters used by the computer vision platform 102 and/or other systems in computing environment 100.

Figure 2A:
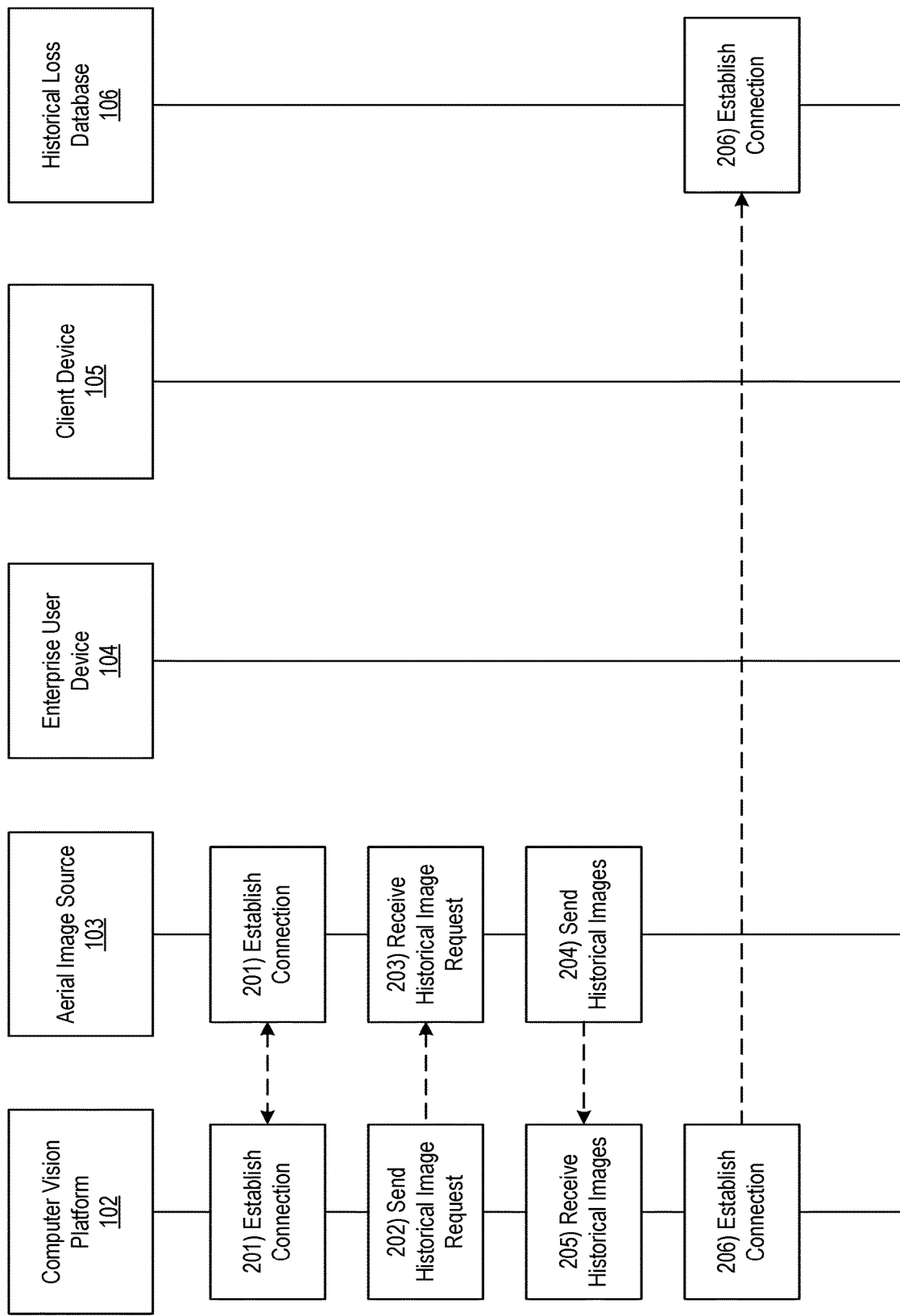

FIGS. 2A-2D depict an illustrative event sequence for applying computer vision methods for likelihood of damage prediction in accordance with one or more example embodiments. Referring to FIG. 2A, at step 201, the computer vision platform 102 may establish a connection with the aerial image source 103. For example, the computer vision platform 102 may establish a first wireless data connection with the aerial image source 103 to link the computer vision platform 102 to the aerial image source 103 (e.g., in preparation for requesting historical images from the aerial image source 103). In some instances, the computer vision platform 102 may identify whether or not a connection is already established with the aerial image source 103. If a connection is already established with the aerial image source 103, the computer vision platform 102 might not re-establish the connection. If a connection is not yet established with the aerial image source 103, the computer vision platform 102 may establish the first wireless data connection as described herein.

At step 202, the computer vision platform 102 may send a request for historical images to the aerial image source 103. For example, the computer vision platform 102 may send the request for historical images to the aerial image source 103 via the communication interface 113 and while the first wireless data connection is established. In some instances, in sending the request for historical images, the computer vision platform 102 may request a plurality of different images or types of images (e.g., store top down images, oblique images, color spectrum images, near infrared images, and/or other images), captured in an aerial manner in a plurality of different geographic regions at a plurality of different times. For example, in these instances, the computer vision platform 102 may request top down images that include roofs of one or more structures (e.g., homes, offices, or the like), and in some instances, may correspond to a group of structures such as a neighborhood. In some instances, the computer vision platform 102 may request oblique images corresponding to each cardinal direction (e.g., north, west, east, south), so as to obtain images corresponding to each side of an asset.

At step 203, the aerial image source 103 may receive the historical image request sent at step 202. For example, the aerial image source 103 may receive the historical image request while the first wireless data connection is established.

At step 204, the aerial image source 103 may send historical images to the computer vision platform 102. For example, the aerial image source 103 may send historical images corresponding to different angles of various assets (e.g., residential and commercial properties), located in various geographic regions, at various times (e.g., different seasons, day vs. night, or the like). For example, the aerial image source 103 may send the historical images to the computer vision platform 102 while the first wireless data connection is established.

At step 205, the computer vision platform 102 may receive the historical images sent at step 204. In some instances, the computer vision platform 102 may receive the historical images via the communication interface 113 and while the first wireless data connection is established.

At step 206, the computer vision platform 102 may establish a connection with the historical loss database 106. For example, the computer vision platform 102 may establish a second wireless data connection with the historical loss database 106 to link the computer vision platform 102 with the historical loss database 106 (e.g., for the purpose of requesting historical loss data). In some instances, the computer vision platform 102 may identify whether or not a connection is already established with the historical loss database 106. If a connection is already established with the historical loss database 106, the computer vision platform 102 might not re-establish the connection. If a connection is not yet established with the historical loss database 106, the computer vision platform 102 may establish the second wireless data connection as described herein.

Figure 2B:
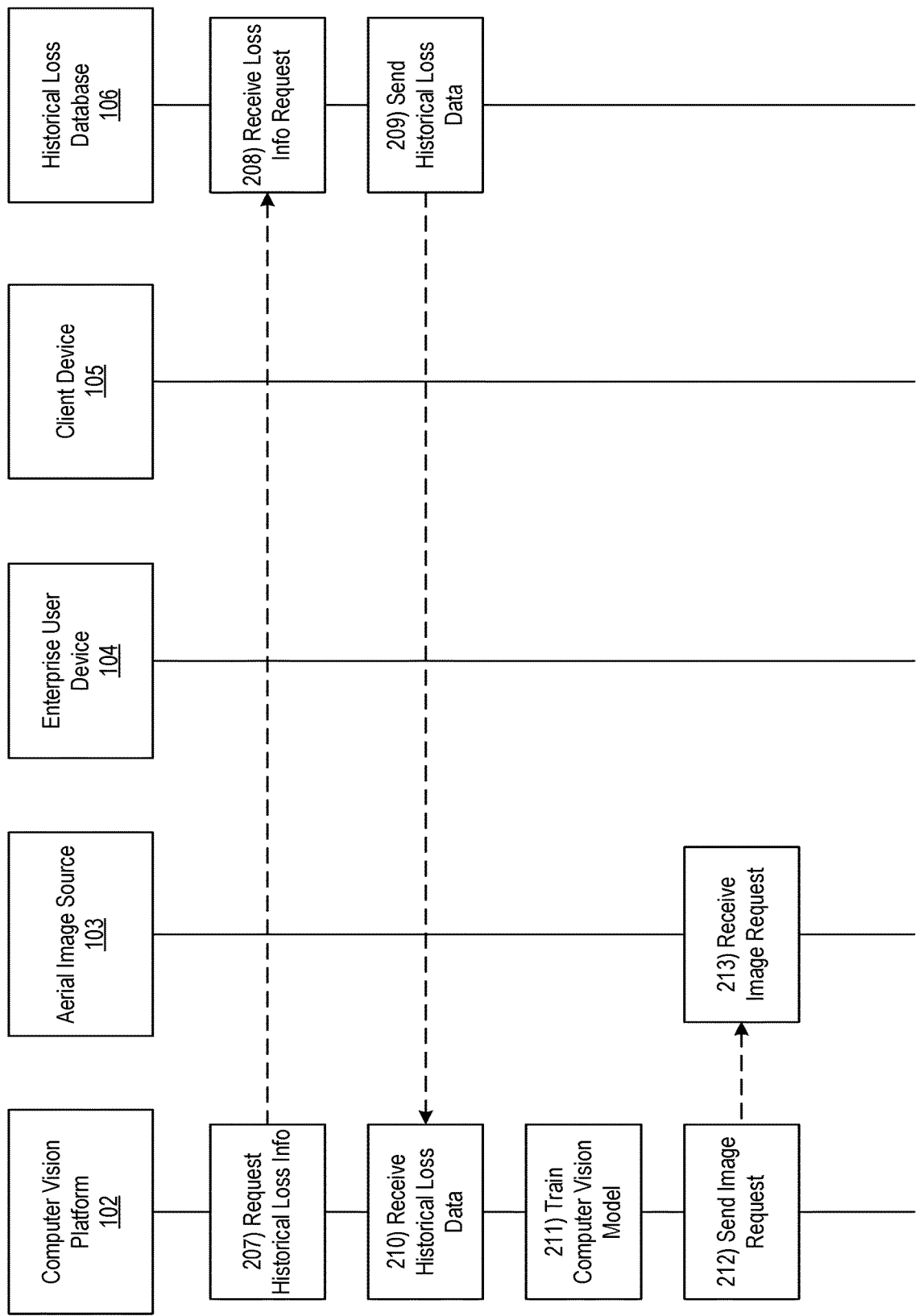

Referring to FIG. 2B, at step 207, the computer vision platform 102 may send a request for historical loss information to the historical loss database 106. For example, the computer vision platform 102 may request historical claim information corresponding to various assets indicating that the asset endured damage or was otherwise impacted in such a way that a claim resulted. In some instances, the computer vision platform 102 may request historical claim information corresponding to fire damage, flood damage, wind damage, hail damage, and/or other damage. In some instances, the computer vision platform 102 may send the request for historical loss information to the historical loss database 106 via the communication interface 113 and while the second wireless data connection is established.

At step 208, the historical loss database 106 may receive the historical loss information request sent at step 207. For example, the historical loss database 106 may receive the historical loss information request while the second wireless data connection is established.

At step 209, the historical loss database 106 may send the historical loss data to the computer vision platform 102. For example, the historical loss database 106 may send the historical loss data to the computer vision platform 102 while the second wireless data connection is established.

At step 210, the computer vision platform 102 may receive the historical loss data sent at step 209. For example, the computer vision platform 102 may receive the historical loss data via the communication interface 113 and while the second wireless data connection is established.

At step 211, the computer vision platform 102 may train a neural network computer vision model using the historical loss data (received at step 210) and the historical images (received at step 205). For example, the computer vision platform 102 may train the computer vision model to identify likelihood of damage information, which may, in some instances, include likelihood of damage and/or insurance premiums based on a particular image. For example, the computer vision platform 102 may train the computer vision model to identify, using a holistic approach and without identifying specific risk factors, the likelihood of damage information. More specifically, the computer vision platform 102 may train the computer vision model to identify, for example, a 5% chance of damage based on an image in its entirety, rather than outputting a proximity of a tree to a house in the image, inputting this proximity into a model, and identifying, based on the proximity using the model, a likelihood of damage. As another example, rather than identifying a number of feet between a house and a fire hydrant, and then plugging this distance into another model, the computer vision platform 102 may just analyze an image in its entirety to identify a risk of fire damage. Furthermore, the computer vision platform 102 may train the computer vision model to identify a likelihood of damage in an image without performing direct comparisons between stored images in the model and the particular image. Rather, the computer vision platform 102 may train the computer vision model to identify likelihood of damage directly from the particular image (e.g., a risk of damage to a property shown in the image). For example, the computer vision model may correlate the historic damage information with the historic images, and may establish a set of rules, based on features of historic images with corresponding damage information, that may be applied to identify likelihood of damage in future images (which may e.g., be top down images, oblique images, color spectrum images, near infrared images, and/or other images). In doing so, the computer vision platform 102 may establish a model based on images and truth outcomes (e.g., for each image, was damage experienced at a later time). In some instances, the computer vision model may be trained to analyze a plurality of future images, each corresponding to a particular property. For example, the computer vision model may be trained to analyze likelihood of damage from a plurality of angles.

Additionally or alternatively, the computer vision platform 102 may train the computer vision model using metadata corresponding to the historic images (e.g., time information, geolocation information, and/or other corresponding information). For example, the computer vision platform 102 may train the computer vision model to identify different likelihoods of damage based on a location of a particular asset (e.g., located in a climate with heavy snow vs. no snow), a time of year (e.g., likelihood of damage in winter vs. summer), and/or other information.

In some instances, in training the computer vision model, the computer vision platform 102 may train a plurality of sub-models, each intended to identify a likelihood of damage related to a particular peril. For example, the computer vision platform 102 may train a likelihood of fire damage sub-model, a likelihood of tornado damage sub-model, a likelihood of flood damage sub-model, a likelihood of wind damage sub-model, a likelihood of hail damage sub-model, and/or other sub-models configured to identify likelihood of a particular damage type. In these instances, the computer vision platform 102 may identify a likelihood of each peril (e.g., what is the likelihood of tornado damage, or other specific damage types corresponding to each sub-model). In some instances, each sub model may output a score (e.g., 1-10 with 1 being the least likely to experience damage and 10 being the most likely) indicating predicted likelihood of damage. In these instances, the computer vision platform 102 may train the computer vision model to generate, based on results of the sub-models, an aggregate output indicating aggregate likelihood of damage. For example, the computer vision model may comprise, for example: likelihood of damage=0.2*likelihood of fire damage+0.2*likelihood of tornado damage+0.2*likelihood of flood damage+0.2*likelihood of wind damage+0.2*likelihood of hail damage.

Additionally, the computer vision platform 102 may train the computer vision model to output pricing information (e.g., insurance premiums, or other prices). For example, the computer vision model may apply the following algorithm to output premium pricing: premium price=baseline price+ (likelihood of damage*baseline price).

In doing so, the computer vision platform 102 may identify a likelihood of loss before such loss occurs (e.g., in contrast to identifying, after the damage has occurred, that damage has in fact occurred and/or identifying a severity of such damage).

At step 212, the computer vision platform 102 may send a request for one or more current images to the aerial image source 103. For example, the computer vision platform 102 may send a request for one or more current images of a particular asset (e.g., a commercial or residential property). In some instances, the historical images, received at step 205, might not include images of the particular asset (e.g., because the computer vision model was trained at step 211 to directly identify likelihood of damage based on images without performing image comparison, historical images of the particular asset might not be needed). In some instances, the computer vision platform 102 may request a plurality of images of different angles and/or formats corresponding to the particular asset (e.g., top down images, oblique images, color spectrum images, near infrared images, and/or other images). For example, in these instances, the computer vision platform 102 may request top down images that include roofs of one or more structures (e.g., homes, offices, or the like), and in some instances, may correspond to a group of structures such as a neighborhood. In some instances, the computer vision platform 102 may request oblique images corresponding to each cardinal direction (e.g., north, west, east, south), so as to obtain images corresponding to each side of an asset. In some instances, the computer vision platform 102 may send the request for the one or more current images via the communication interface 113 and while the first wireless data connection is established.

At step 213, the aerial image source 103 may receive the request for one or more images sent at step 212. For example, the aerial image source 103 may receive the request for one or more images while the first wireless data connection is established.

Figure 2C:
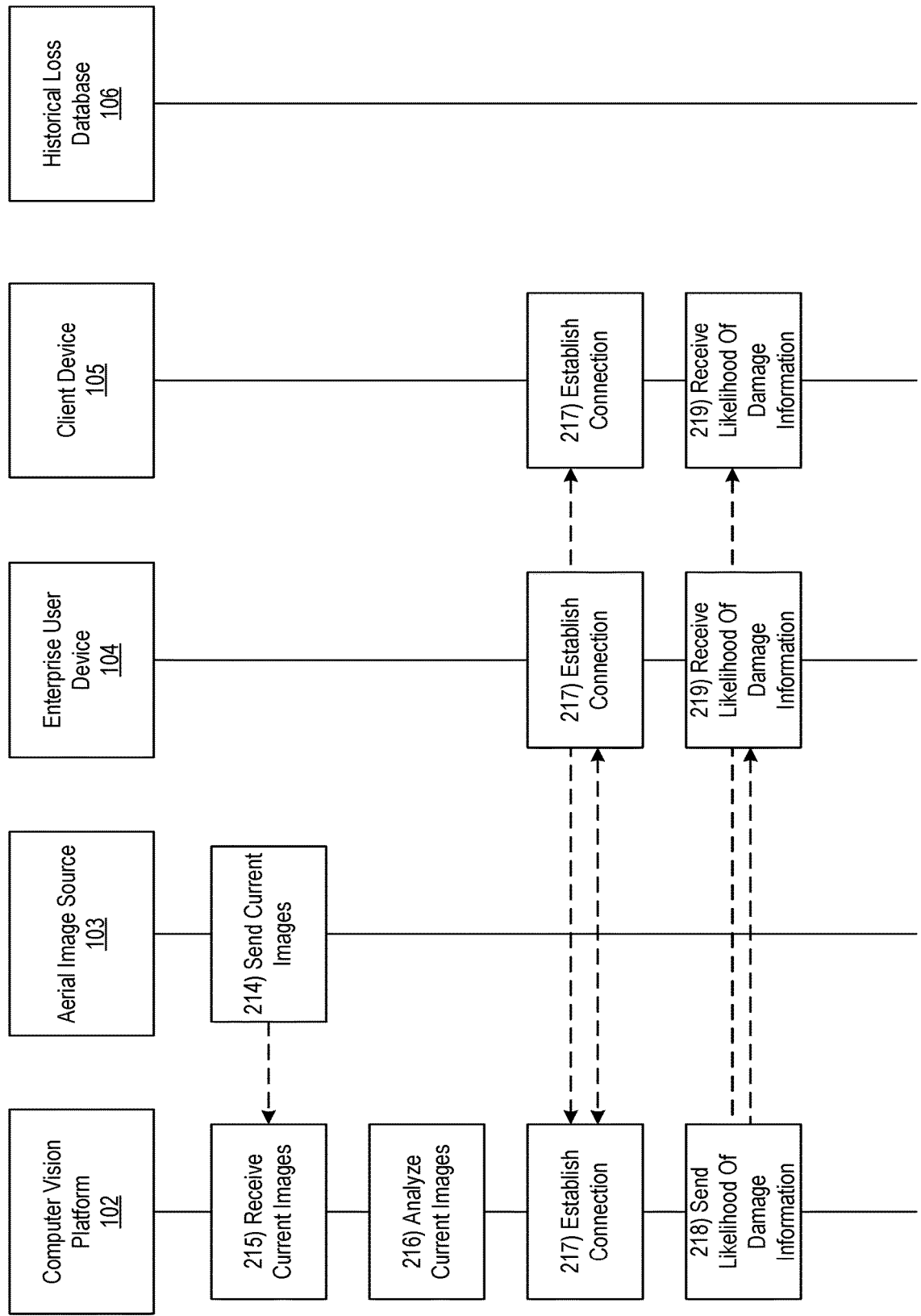

Referring to FIG. 2C, at step 214, the aerial image source 103 may send current images (e.g., of the particular asset) to the computer vision platform 102. For example, the aerial image source 103 may send top down images, oblique images, color spectrum images, near infrared images, and/or other images (along with corresponding metadata). The aerial image source 103 may send the current images to the computer vision platform 102 while the first wireless data connection is established.

At step 215, the computer vision platform 102 may receive the current images sent at step 214. For example, the computer vision platform 102 may receive the current images via the communication interface 113 and while the first wireless data connection is established.

At step 216, the computer vision platform 102 may analyze the current images, received at step 215, using the computer vision model trained at step 211. For example, using a holistic analysis approach for each image, the computer vision platform 102 may identify a likelihood of damage and/or pricing information directly from the current images.

For example, the computer vision platform 102 may apply a computer vision model, trained on historical loss data and images, to the current images to output likelihood of damage and/or insurance premiums for an asset corresponding to the current images. More specifically, using a holistic approach and without identifying specific risk factors, the computer vision platform 102 may output likelihood of damage information for the asset indicating a likelihood that the asset may experience damage in the future (e.g., risk of future damage), and/or corresponding pricing information (e.g., premiums for a homeowners policy for the corresponding asset based on the risk of future damage). For example, the computer vision platform 102 may output, for example, a 5% chance of damage based on the current images, rather than outputting a proximity of a tree to a house in the current images, and identifying, based on the proximity, a likelihood of damage. In some instances, in analyzing the current images, the computer vision platform 102 may use the computer vision model to identify a likelihood of damage for the asset without performing direct comparisons between stored images in the model and the current images (in fact, in some instances, the computer vision model might not even include historical images corresponding to the asset). Rather, the computer vision platform 102 may use the computer vision model to identify a likelihood of damage directly from the current images (e.g., a risk of damage to a property shown in the image). For example, the computer vision model may apply an established set of rules, based on features of historic images with corresponding damage information, to identify likelihood of damage in the current images (which may e.g., be top down images, oblique images, color spectrum images, near infrared images, and/or other images). In some instances, the computer vision model may analyze likelihood of damage from a plurality of angles. In some instances, the computer vision platform 102 may identify that an asset is obscured in the images by foliage, and may factor this identification into the likelihood of damage analysis.

Additionally or alternatively, the computer vision platform 102 may use metadata corresponding to the current images (e.g., time information, geolocation information, and/or other corresponding information) when applying the computer vision model. For example, the computer vision platform 102 may identify a likelihood of damage based on a location of the asset (e.g., located in a climate with heavy snow vs. no snow), a time of year corresponding to the current images (e.g., likelihood of damage in winter vs. summer), and/or other information.

In some instances, in applying the computer vision model, the computer vision platform 102 may apply a plurality of sub-models, each intended to identify a likelihood of damage related to a particular peril. For example, the computer vision platform 102 may apply one or more of: a likelihood of fire damage sub-model, a likelihood of tornado damage sub-model, a likelihood of flood damage sub-model, a likelihood of wind damage sub-model, a likelihood of hail damage sub-model, and/or other sub-models configured to identify likelihood of a particular damage type. In these instances, the computer vision platform 102 may use the computer vision model to generate, based on results of the sub-models, an aggregate output indicating aggregate likelihood of damage. For example, the computer vision model may comprise, for example: likelihood of damage=0.2*likelihood of fire damage+0.2*likelihood of tornado damage+0.2*likelihood of flood damage+0.2*likelihood of wind damage+0.2*likelihood of hail damage.

Additionally, the computer vision platform 102 may use the computer vision model output to adjust pricing information (e.g., insurance premiums, or other prices). For example, the computer vision model may apply the following algorithm to output premium pricing: premium price=baseline price+(likelihood of damage*baseline price). Accordingly, the result of applying the computer vision model may be a likelihood of future damage (e.g., a likelihood of damage score) and/or corresponding pricing information (e.g., for premiums or the like).

At step 217, the computer vision platform 102 may establish a connection with the enterprise user device 104 and/or client device 105. For example, the computer vision platform 102 may establish a third and/or fourth wireless data connection with the enterprise user device 104 and/or client device 105 to link the computer vision platform 102 to the enterprise user device 104 and/or client device 105 (e.g., in preparation for sending likelihood of damage information). In some instances, the computer vision platform 102 may identify whether a connection is already established with the enterprise user device 104 and/or client device 105. If a connection is already established with the enterprise user device 104 and/or client device 105, the computer vision platform 102 might not re-establish the connection. If a connection is not yet established with the enterprise user device 104 and/or client device 105, the computer vision platform 102 may establish the third and/or fourth wireless data connections as described herein.

At step 218, the computer vision platform 102 may send the likelihood of damage information, generated at step 216, to the enterprise user device 104 and/or the client device 105. For example, the computer vision platform 102 may send the likelihood of damage information to the enterprise user device 104 and/or the client device 105 via the communication interface 113 and while the third and/or fourth wireless data connections are established. In some instances, in addition to the likelihood of damage information, the computer vision platform 102 may send one or more commands directing the enterprise user device 104 and/or client device 105 to display a graphical user interface based on the likelihood of damage information.

At step 219, the enterprise user device 104 and/or client device 105 may receive the likelihood of damage information sent at step 218. For example, the enterprise user device 104 and/or client device 105 may receive the likelihood of damage information while the third and/or fourth wireless data connections are established. In some instances, the enterprise user device 104 and/or client device 105 may also receive the one or more commands directing the enterprise user device 104 and/or client device 105 to display a graphical user interface based on the likelihood of damage information.

Referring to FIG. 2D, at step 220, based on or in response to the one or more commands directing the enterprise user device 104 and/or client device 105 to display a graphical user interface based on the likelihood of damage information, the enterprise user device 104 and/or client device 105 may display a likelihood of damage interface. For example, the enterprise user device 104 and/or client device 105 may display a graphical user interface similar to graphical user interface 405, which is shown in FIG. 4. For example, the enterprise user device 104 and/or client device 105 may display damage risks by peril and/or an overall likelihood of damage. Additionally or alternatively, the enterprise user device 104 and/or client device 105 may display a graphical user interface similar to graphical user interface 505, which is shown in FIG. 5. For example, the enterprise user device 104 and/or client device 105 may display an identified premium.

Figure 3:
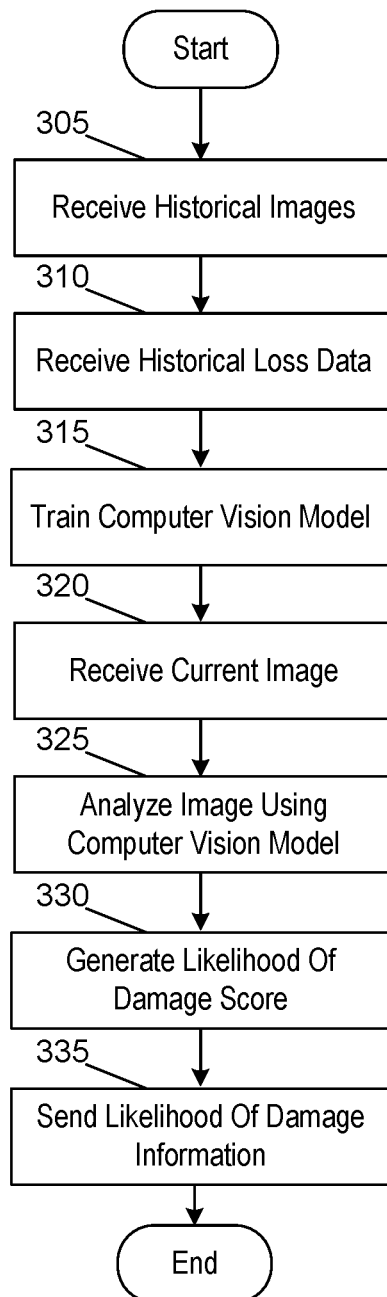
FIG. 3 depicts an illustrative method for applying computer vision methods for likelihood of damage prediction in accordance with one or more example embodiments.

FIG. 3 depicts an illustrative method for applying computer vision methods for likelihood of damage prediction in accordance with one or more example embodiments. Referring to FIG. 3, at step 305, a computing platform having at least one processor, a communication interface, and a memory may receive historical images for a plurality of assets. At step 310, the computing platform may receive historical loss data for the plurality of assets. At step 315, the computing platform may train a computer vision model, using the historical images and historical loss data, to identify likelihood of damage for a particular asset. At step 320, the computing platform may receive a current image of a particular asset. At step 325, the computing platform may analyze the current image using the computer vision model. At step 330, the computing platform may generate a likelihood of damage score, based on the analysis of the current image. At step 335, the computing platform may send likelihood of damage information for display at one or more user devices.

FIGS. 6A-6H depict an illustrative event sequence for applying computer vision methods for asset evaluation in accordance with one or more example embodiments. In some instances, the methods described in FIGS. 6A-6H may be performed in addition to or instead of the methods described above with regard to FIGS. 2A-2D. For example, the models described in FIGS. 6A-6H may be applied to analyze the current images, received by the computer vision platform 102 at step 216. Accordingly, these current images may be analyzed by a plurality of models (as described in FIG. 6A-6H) in addition to or instead of the models described in FIGS. 2A-2D. Similarly, these models in FIGS. 6A-6H may be trained using the historical images received at step 205. The models described in FIGS. 6A-6H are trained and applied in a particular order for illustrative purposes only, and may be applied in any order without departing from the scope of the disclosure. Similarly, the computer vision platform 102 may apply any single model or combination of models (e.g., without applying the others) without departing from the scope of the disclosure.

Figure 6A:
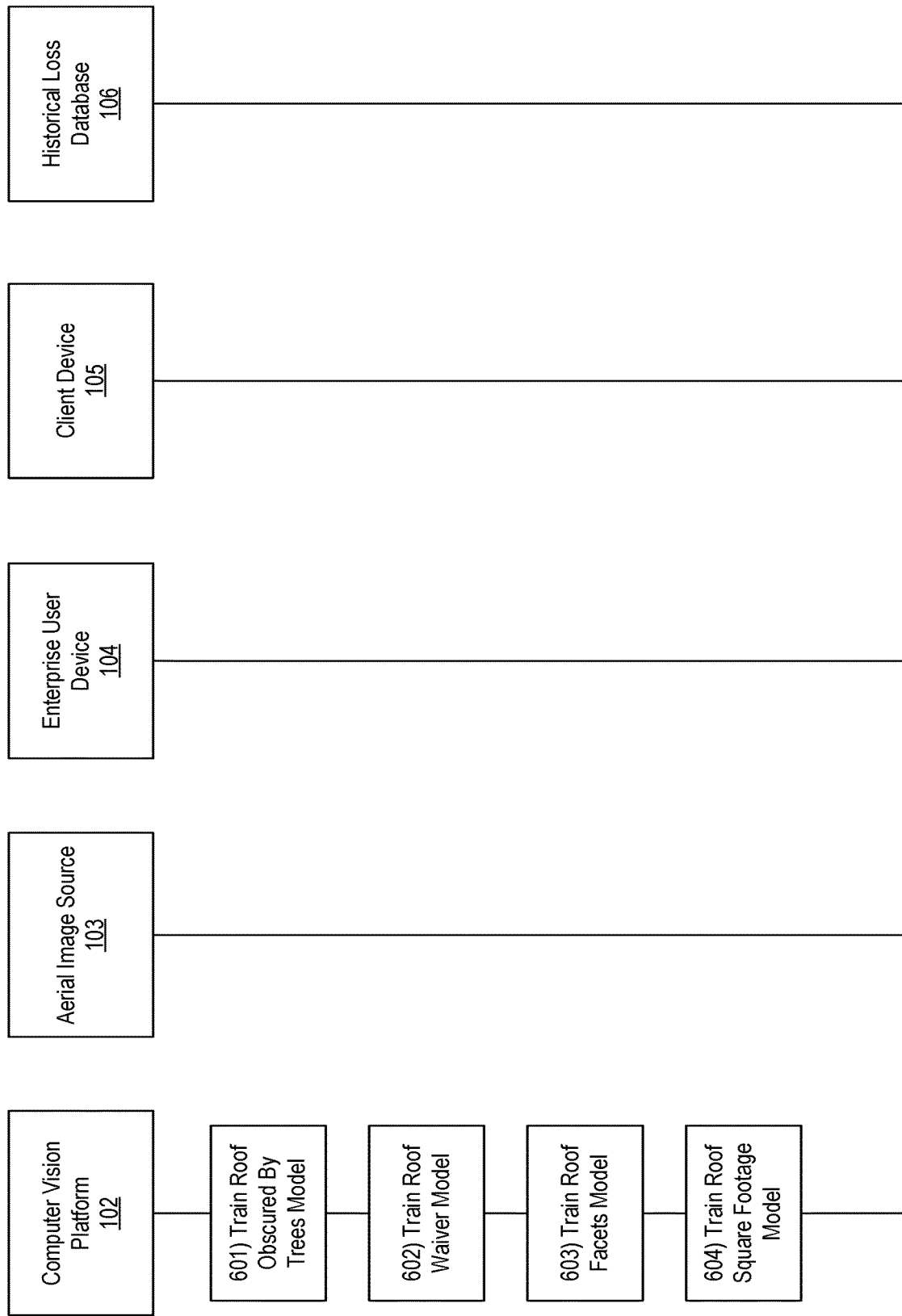

Referring to FIG. 6A, at step 601, the computer vision platform 102 may train a roof obscured by trees model that detects trees and calculates their roof overlap proportion. For example, the computer vision platform 102 may use the historical images (e.g., received at step 205), which may, e.g., be true color and/or infrared top down images of roofs, to train a computer vision model to identify a percentage of each roof that is obscured by trees (e.g., from an aerial top down view). For example, using the historical images, the computer vision platform 102 may train the roof obscured by trees model to distinguish or otherwise identify foliage. In addition, the computer vision platform 102 may calculate the overlap of identified trees and foliage with the given building footprint of a property. The computer vision platform 102 may similarly train the roof obscured by trees model to identify, using the identified foliage and based on the identified footprint, a percentage of a roof that is obscured. In doing so, the computer vision platform 102 may effectively train a filter that may be applied to determine a quality of aerial images (e.g., for purposes of evaluating the corresponding property) prior to expending additional computing power to apply such models. For example, if half of a roof is obscured by trees, the images of that roof might not be beneficial in analyzing the corresponding property, and thus further analysis might not be performed, whereas if none of a roof is obscured by trees, the images of that roof may be more beneficial, and thus further analysis may be performed. In some instances, in training the roof obscured by trees model, the computer vision platform 102 may train a model that directly outputs a "go/no go" decision for whether or not additional models should be applied to the rooftop images based on the corresponding images. For example, the computer vision platform 102 may train a model that includes the following rules: roof obstruction percentage=obscured roof surface area/total roof surface area; if obscured roof percentage is greater than 0.2, return "no go" decision; if obscured roof percentage is less than or equal to 0.2, return "go" decision. In some instances, the computer vision platform 102 may select the threshold value (e.g., 0.2) based on accuracy of previously processed images. For example, the computer vision platform 102 may identify a threshold percentage of roof obstruction that appears negligent in the computations performed by additional models (e.g., it does not seem to affect further analysis if 20% of a roof is obscured). However, 20% is merely one example threshold and other threshold may be used without departing from the invention.

At step 602, the computer vision platform 102 may train a roof waiver model. For example, the computer vision platform 102 may use the historical images (e.g., received at step 205), which may, e.g., be true color and/or infrared top down images of roofs, to train a computer vision model to identify whether or not a physical inspection of each roof should be performed (e.g., or whether the roof obviously fails based on computer vision analysis). For example, the computer vision platform 102 may request and receive historical inspection data corresponding to the historical images, indicating whether or not roofs depicted in these historical images passed inspection. The computer vision platform 102 may correlate the historical inspection data with the corresponding historical images so as to provide a labelled set of training data that may train the roof waiver model to identify whether or not a roof will obviously fail inspection (and thus whether or not a physical inspection needs to be performed). For example, for roofs that will obviously fail inspection, the roof waiver model may output "no inspection necessary—roof fails," or something to this effect. In contrast, for roofs that may pass the inspection, the roof waiver model may output "inspection necessary," or something to this effect. In doing so, the roof waiver model may conserve time and effort for clients and inspectors in scheduling inspections by filtering out instances in which an inspection is not necessary, and a repair or claim may be instantly initiated. For example, if the roof waiver model identifies that a portion of a roof is caving in, the roof will obviously fail inspection, and thus it might not be necessary to dispatch a live inspector to provide a failing grade. However, if the roof waiver model identifies that a roof appears to pass inspection, it may still be beneficial to dispatch a live inspector for verification. In some instances, in training the roof waiver model, the computer vision platform 102 may train a model that directly outputs a "go/no go" decision for whether or not a physical inspection should be performed from an image. For example, the computer vision platform 102 may train a model that assigns an automated inspection score to a roof (e.g., indicating a likelihood that the roof will pass an inspection), compares the automated inspection score to an inspection threshold, and returns a result based on the comparison (e.g., if automated inspection score exceeds inspection threshold, return "schedule inspection" result; if automated inspection score does not exceed inspection threshold, return "no inspection needed" result).

At step 603, the computer vision platform 102 may train a roof facets model. For example, the computer vision platform 102 may use the historical images (e.g., received at step 205), which may, e.g., be true color and/or infrared top down images of roofs, to train a computer vision model to identify roof facets, and a complexity of a roof based on the facets. For example, in some instances, the historical images may be labelled based on their corresponding numbers of facets, and also a cost to replace the corresponding roofs. Accordingly, the computer vision platform 102 may establish a relationship between number of facets and repair cost, and may apply this relationship to identify a repair cost for other roofs. In some instances, in addition to identifying a relationship between the number of facets and repair cost, the computer vision platform 102 may identify an overall roof complexity score based on roof inclines, facet directions, roof valleys, facet size, and/or other details to identify how expensive the roof may be to repair. The computer vision platform 102 may store these roof complexity scores along with the corresponding repair costs, and may use correlations between the two to identify repair costs for other roofs. In doing so, the computer vision platform 102 may train a model that may directly identify roof repair costs based on roof facets and complexity identified in an image.

At step 604, the computer vision platform 102 may train a roof square footage model. For example, the computer vision platform 102 may use the historical images (e.g., received at step 205), which may, e.g., be top down and oblique images (e.g., one facing each cardinal direction) of a structure, to train a computer vision model to identify square footage for a structure. For example, the computer vision platform 102 may identify, based on the historical images, a height, a width, a number of stories, whether the roof overhangs (e.g., and thus whether the actual square footage is less than would appear from a top down view), and/or other information corresponding to a structure to identify a square footage. In some instances, in training the roof square footage model, the computer vision platform 102 may train a model that directly outputs a square footage from an image.

Referring to FIG. 6B, at step 605, the computer vision platform may train a proximity to brush model. For example, the computer vision platform 102 may use the historical images (e.g., received at step 205), which may, e.g., be true color and/or infrared top down images of properties, to train a computer vision model to identify a likelihood of fire damage to a structure based on proximity to flammable brush (e.g., based directly on an image). For example, the computer vision platform 102 may use the historical loss information (received at step 210) to identify properties (corresponding to the historical images) that experienced fire damage. The computer vision platform 102 may further train the proximity to brush model to distinguish brush, and, in some instances, a degree to which said brush may be flammable. The computer vision platform 102 may further train the proximity to brush model to identify a distance between the brush and a structure. Using all of this information, the computer vision platform 102 may train the proximity to brush model to identify a likelihood of fire damage due to identified brush. For example, the computer vision platform 102 may train a model that applies the following rules: If no brush identified, no risk of brush fire; If brush identified, does proximity of brush to structure exceed threshold? If so, no risk of brush fire; If not, indicate risk of fire as a function of proximity between brush and threshold. For example, the computer vision platform 102 may train the proximity to brush model to correlate likelihood of fire damage in a direct manner to the distance identified between brush and a structure.

At step 606, the computer vision platform 102 may train a fence localization model. For example, the computer vision platform 102 may use the historical images (e.g., received at step 205), which may, e.g., be true color and/or infrared top down and/or oblique images of properties, to train a computer vision model to identify fence locations on a property, and/or features of identified fences (e.g., height, openings, fence condition, and/or other features). For example, the computer vision platform 102 may identify fence locations so as to identify a risk posed by various property features (e.g., a pool, body of water, and/or potentially other dangerous property features). In some instances, the computer vision platform 102 may request and receive historical injury data corresponding to injuries resulting from various property features. The computer vision platform 102 may correlate the historical injury data with the corresponding historical images so as to provide a labelled set of training data that may train the fence localization model to identify a risk of injury due to the presence, position, or lack thereof of fences. In some instances, in training the roof waiver model, the computer vision platform 102 may train a model that directly outputs a likelihood of corresponding to the property. For example, a property with a fence surrounding a pool may be safer than one in which a pool is unprotected by a fence. Similarly, the higher a fence is, the safer it may be. In some instances, in training the fence localization model, the computer vision platform 102 may train a model to output a likelihood of injury directly based on an image.

At step 607, the computer vision platform 102 may train a premium pricing model. For example, the computer vision platform 102 may request and receive the historical pricing information (e.g., for premiums). The computer vision platform 102 may train the premium pricing model to correlate the outputs of the models trained in steps 601-607 (and/or the model described with regard to FIGS. 2A-2D) with historical pricing information. For example, the computer vision platform 102 may train a model that directly outputs a premium price based on evaluation of the historical images. For example, in training the premium pricing model, the computer vision platform 102 may train a model that applies the following formula: premium price=baseline price*[1+((identified roof replacement cost/average roof replacement cost)+(identified square footage/average square footage)+(likelihood of fire damage due to brush)+likelihood of injury)+(likelihood of future damage))]. In this example, the average numbers may be identified by the computer vision platform 102 based on historical data corresponding to a particular geographic region, time of year, and/or other demographic information. Furthermore, in this example, the likelihood of future damage may be identified by the model described with regard to FIGS. 2A-2D.

At step 608, the computer vision platform 102 may begin analysis (or, in some instances, continue the analysis described above with regards to FIGS. 2A-2D) of the current image (e.g., the current image(s) received at step 215. For example, the computer vision platform 102 may identify a footprint of a structure identified in the current image. For example, the computer vision platform 102 may analyze the current image to distinguish between a roofline (e.g., from a top down view) and its surroundings.

Figure 6C:
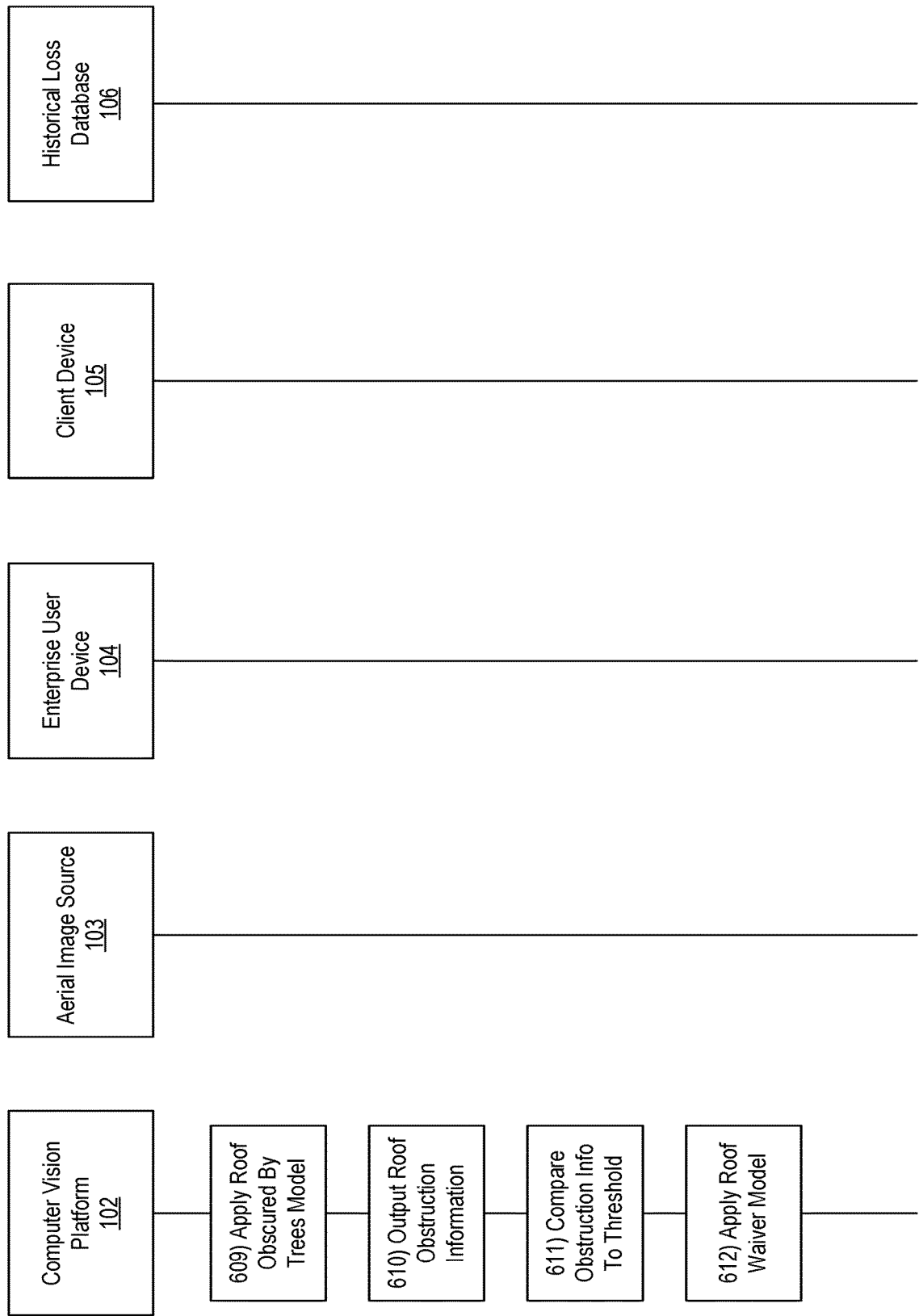

Referring to FIG. 6C, at step 609, the computer vision platform 102 may apply the roof obscured by trees model (e.g., trained at step 601). For example, the computer vision platform 102 may apply the roof obscured by trees model to the current image to identify a percentage of a roof (shown in the current image) that is obscured by trees (e.g., from an aerial top down view). For example, the computer vision platform 102 may apply the roof obscured by trees model to distinguish or otherwise identify foliage obstructing view of the roof. At step 610, as a result of applying the roof obscured by trees model, the computer vision platform 102 may output roof obstruction information indicating an identified a percentage of the roof that is obscured (e.g., by trees or other foliage).

At step 611, the computer vision platform 102 may use the roof obscured by trees model to compare the obstruction information to an obstruction threshold. If the computer vision platform 102 determines that the obstruction information exceeds the obstruction threshold, the computer vision platform 102 may proceed to step 626. If the computer vision platform determines that the obstruction information does not exceed the obstruction threshold, the computer vision platform 102 may proceed to step 612. For example, in applying the roof obscured by trees model, the computer vision platform 102 may output a "go/no go" decision for whether or not additional models should be applied to the current image. For example, in applying the roof obscured by trees model the computer vision platform 102 may apply the following rules: roof obstruction percentage=obscured roof surface area/total roof surface area; if obscured roof percentage is greater than 0.2, return "no go" decision; if obscured roof percentage is less than or equal to 0.2, return "go" decision. In some instances, the computer vision platform 102 may dynamically adjust the threshold value (e.g., 0.2) based on accuracy of previously processed images. For example, the computer vision platform 102 may identify a threshold percentage of roof obstruction that appears negligent in the computations performed by additional model.

In some instances, in applying the roof obscured by trees model, the computer vision platform 102 might not compare the current image(s) to the historical images. Rather, the computer vision platform 102 may perform a holistic analysis of the current image(s) using the roof obscured by trees model (which, e.g., was trained using the historical images). For example, in some instances, the current image(s) may depict a property that is not depicted in the historical images.

In doing so, the computer vision platform 102 may effectively filter aerial images (e.g., for purposes of evaluating the corresponding roofs) prior to expending additional computing power to apply additional models that may evaluate these images. For example, the computer vision platform 102 may only proceed to evaluate roofs in images that are obstructed less than a particular amount.

At step 612, the computer vision platform 102 may apply the roof waiver model (e.g., trained at step 602). For example, the computer vision platform 102 may apply the roof waiver model to the current image(s) (received at step 215) which may, e.g., be true color and/or infrared top down images of a roof, to identify whether or not a physical inspection of the roof should be performed (e.g., or whether the roof obviously fails based on computer vision analysis). For example, the computer vision platform 102 may apply the roof waiver model to identify a likelihood that the roof will pass inspection.

Figure 6D:
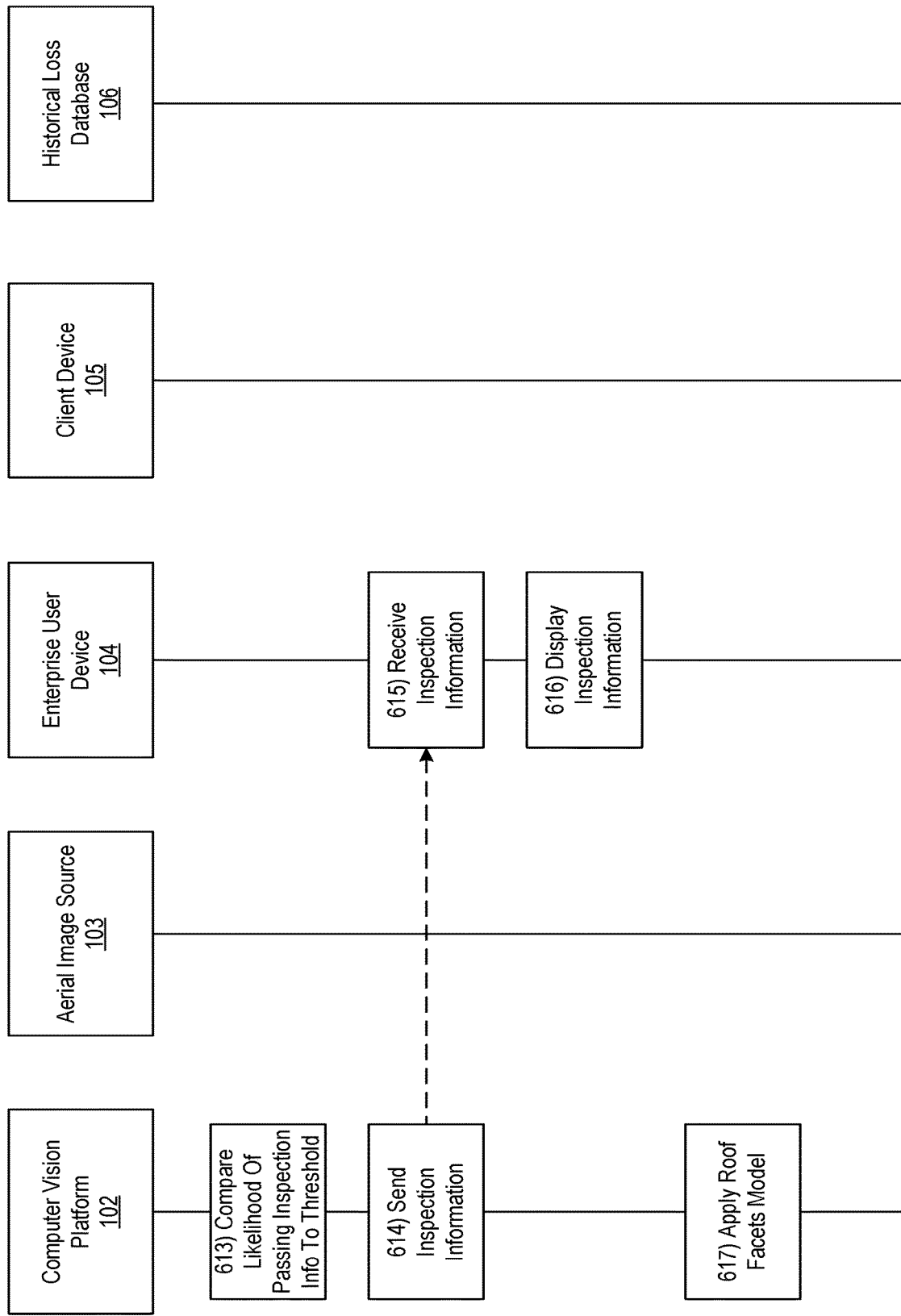
Figure 6E:
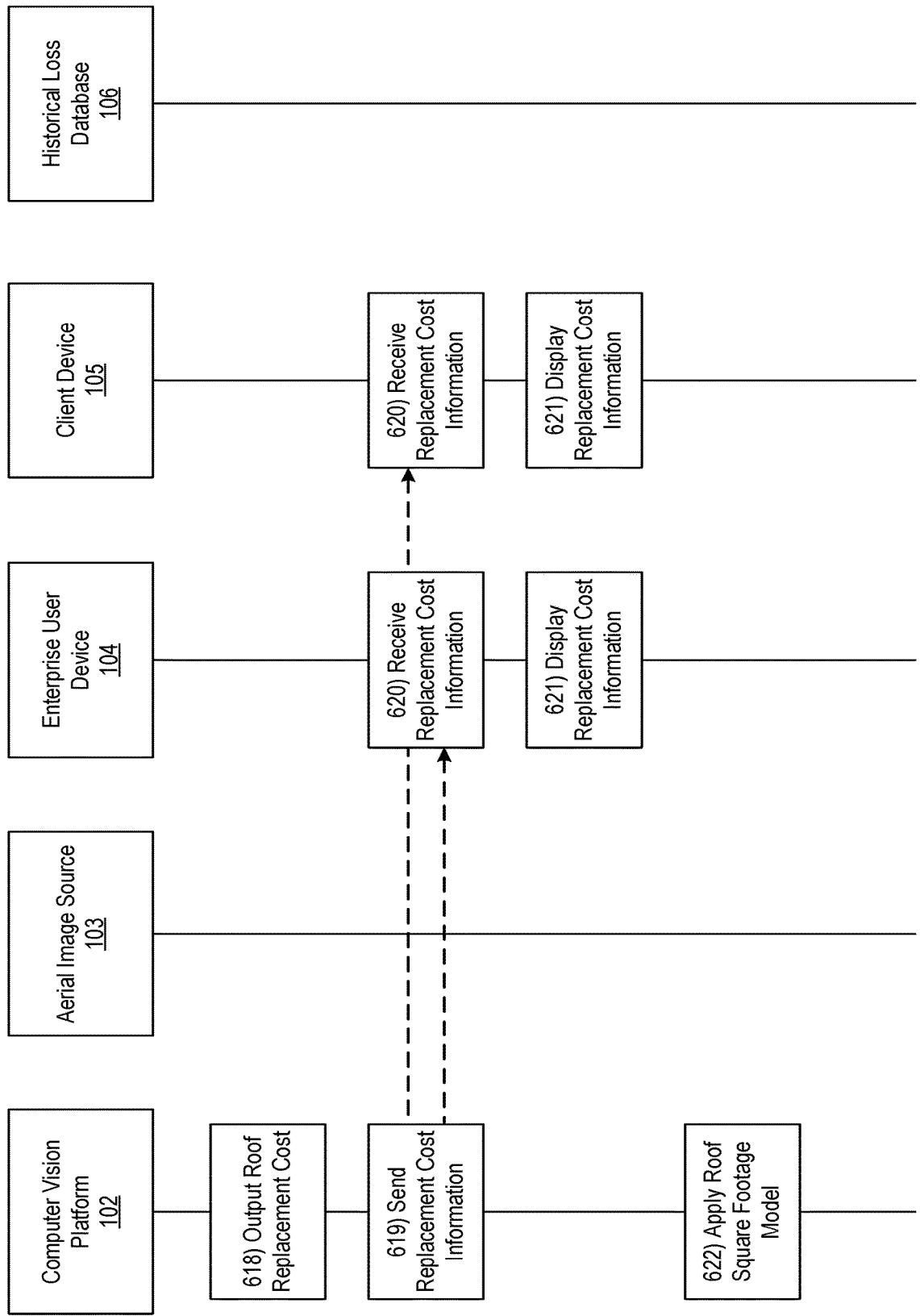

Referring to FIG. 6D, at step 613, the computer vision platform 102 may use the roof waiver model to compare the likelihood of passing inspection information, output at step 612, to an inspection threshold. If the computer vision platform 102 determines that the likelihood of passing inspection information does not exceed the inspection threshold, the computer vision platform 102 may output inspection information indicating that a physical inspection should not be conducted, and that the inspection is failed. If the computer vision platform 102 determines that the likelihood of passing inspection information does exceed the inspection threshold, the computer vision platform 102 may output inspection information indicating that a physical inspection should be conducted.

In some instances, in applying the roof waiver model, the computer vision platform 102 might not compare the current image(s) to the historical images. Rather, the computer vision platform 102 may perform a holistic analysis of the current image(s) using the roof wavier model (which, e.g., was trained using the historical images). For example, in some instances, the current image(s) may depict a property that is not depicted in the historical images.

At step 614, the computer vision platform 102 may send the inspection information and one or more commands directing the enterprise user device 104 to display the inspection information to the enterprise user device 104. In some instances, the computer vision platform 102 may send the inspection information and one or more commands directing the enterprise user device 104 to display the inspection information to the enterprise user device 104 via the communication interface 113 and while the third wireless data connection is established.

At step 615, the enterprise user device 104 may receive the inspection information and one or more commands directing the enterprise user device 104 to display the inspection information, sent at step 614. For example, the enterprise user device 104 may receive the inspection information and one or more commands directing the enterprise user device 104 to display the inspection information while the third wireless data connection is established.

At step 616, the enterprise user device 104 may display the inspection information, received at step 615. For example, the enterprise user device 104 may display the inspection information based on or in response to the one or more commands directing the enterprise user device 104 to display the inspection information. In some instances, in displaying the inspection information, the enterprise user device 104 may display a graphical user interface similar to graphical user interface 805, which is shown in FIG. 8. For example, the enterprise user device 104 may display a graphical user interface indicating that the roof in the current image will not pass inspection, and that there is no need to dispatch a physical representative to inspect the roof.

At step 617, the computer vision platform 102 may apply the roof facets model (trained at step 603) to the current image(s) received at step 215. For example, the computer vision platform 102 may use the roof facets model to output an overall roof complexity score for a roof included in the current images based on roof inclines, facet directions, roof valleys, facet size, and/or other details relating to how expensive the roof may be to repair. In some instances, the computer vision platform 102 may identify the overall roof complexity score directly from the current image.

Referring to FIG. 2E, at step 618, the computer vision platform 102 may use the roof facets model to output a roof replacement cost. For example, the computer vision platform 102 may apply the roof facets model to the overall roof complexity score to identify a cost to replace the roof (e.g., it might not currently need to be replaced, but may need to be replaced at some future time).

In some instances, in applying the roof facets model, the computer vision platform 102 might not compare the current image(s) to the historical images. Rather, the computer vision platform 102 may perform a holistic analysis of the current image(s) using the roof facets model (which, e.g., was trained using the historical images). For example, in some instances, the current image(s) may depict a property that is not depicted in the historical images.

At step 619, the computer vision platform 102 may send replacement cost information, based on the identified replacement cost, and one or more commands directing the enterprise user device 104 and/or the client device 105 to display the replacement cost information. For example, the computer vision platform 102 may send replacement cost information and one or more commands directing the enterprise user device 104 and/or the client device 105 to display the replacement cost information via the communication interface 113 and while the third and/or fourth wireless data connections are established.

At step 620, the enterprise user device 104 and/or the client device 105 may receive the replacement cost information and one or more commands directing the enterprise user device 104 and/or the client device 105 to display the replacement cost information. For example, the enterprise user device 104 and/or the client device 105 may receive the replacement cost information and one or more commands directing the enterprise user device 104 and/or the client device 105 to display the replacement cost information while the third and/or fourth wireless data connections are established.

At step 621, the enterprise user device 104 and/or the client device 105 may display the replacement cost information, received at step 620. For example, the enterprise user device 104 and/or the client device 105 may display the replacement cost information based on or in response to the one or more commands directing the enterprise user device 104 and/or the client device 105 to display the replacement cost information. In some instances, in displaying the replacement cost information, the enterprise user device 104 and/or the client device 105 may display a graphical user interface similar to graphical user interface 905, which is shown in FIG. 9.

At step 622, the computer vision platform 102 may apply the roof square footage model (e.g., trained at step 604). For example, the computer vision platform 102 may use the roof square footage model to identify square footage for a structure based on the current image(s) received at step 215. In doing so, the computer vision platform 102 may output square footage information directly from the current image (s).

In some instances, in applying the roof square footage model, the computer vision platform 102 might not compare the current image(s) to the historical images. Rather, the computer vision platform 102 may perform a holistic analysis of the current image(s) using the roof square footage model (which, e.g., was trained using the historical images). For example, in some instances, the current image(s) may depict a property that is not depicted in the historical images.

Figure 6F:
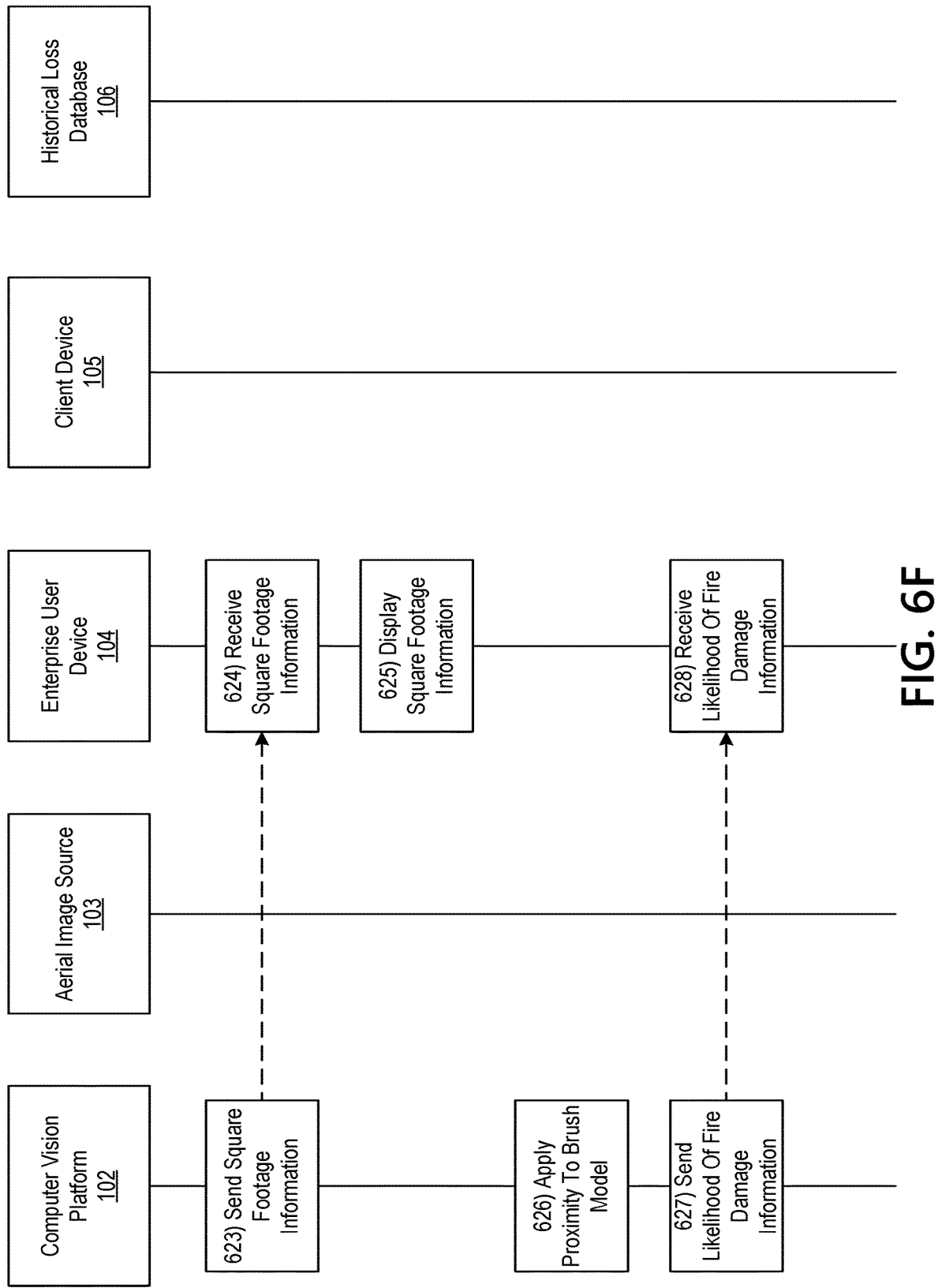

Referring to FIG. 6F, at step 623, the computer vision platform 102 may send the square footage information and one or more commands directing the enterprise user device 104 to display the square footage information, to the enterprise user device 104. For example, the computer vision platform 102 may send the square footage information and one or more commands directing the enterprise user device 104 to display the square footage information to the enterprise user device via the communication interface 113 and while the third wireless data connection is established.

At step 624, the enterprise user device 104 may receive the square footage information and one or more commands directing the enterprise user device 104 to display the square footage information from the computer vision platform 102. For example, the enterprise user device 104 may receive square footage information and one or more commands directing the enterprise user device 104 to display the square footage information from the computer vision platform 102 while the third wireless data connection is established.

At step 625, based on or in response to the one or more commands directing the enterprise user device 104 to display the square footage information, the enterprise user device 104 may display the square footage information. For example, the enterprise user device 104 may display a graphical user interface similar to graphical user interface 1005, which is shown in FIG. 10, which includes square footage of a particular home included in the current images (s).

At step 626, the computer vision platform 102 may apply the proximity to brush model (e.g., trained at step 605). For example, the computer vision platform 102 may identify a likelihood of fire damage to a structure (e.g., based on proximity to flammable brush) directly from the current image(s) received at step 215. For example, the computer vision platform 102 may apply the following rules: If no brush identified, no risk of brush fire; If brush identified, does proximity of brush to structure exceed threshold? If so, no risk of brush fire; If not, indicate risk of fire as a function of proximity between brush and threshold. In doing so, the computer vision platform 102 may output likelihood of fire damage information indicating a likelihood of fire damage to a structure corresponding to the current image(s).

In some instances, in applying the proximity to brush model, the computer vision platform 102 might not compare the current image(s) to the historical images. Rather, the computer vision platform 102 may perform a holistic analysis of the current image(s) using the proximity to brush model (which, e.g., was trained using the historical images). For example, in some instances, the current image(s) may depict a property that is not depicted in the historical images.

At step 627, the computer vision platform 102 may send the likelihood of fire damage information, output at step 626, and one or more commands directing the enterprise user device 104 to display the likelihood of fire damage information, to the enterprise user device 104. For example, the computer vision platform 102 may send the likelihood of fire damage information to the enterprise user device 104 and the one or more commands directing the enterprise user device 104 to display the likelihood of fire damage information from the computer vision platform 102 via the communication interface 113 and while the third wireless data connection is established.

At step 628, the enterprise user device 104 may receive the likelihood of fire damage information and the one or more commands directing the enterprise user device 104 to display the likelihood of fire damage information from the computer vision platform 102. For example, the enterprise user device 104 may receive the likelihood of fire damage information and the one or more commands directing the enterprise user device 104 to display the likelihood of fire damage information while the third wireless data connection is established.

Figure 6G:
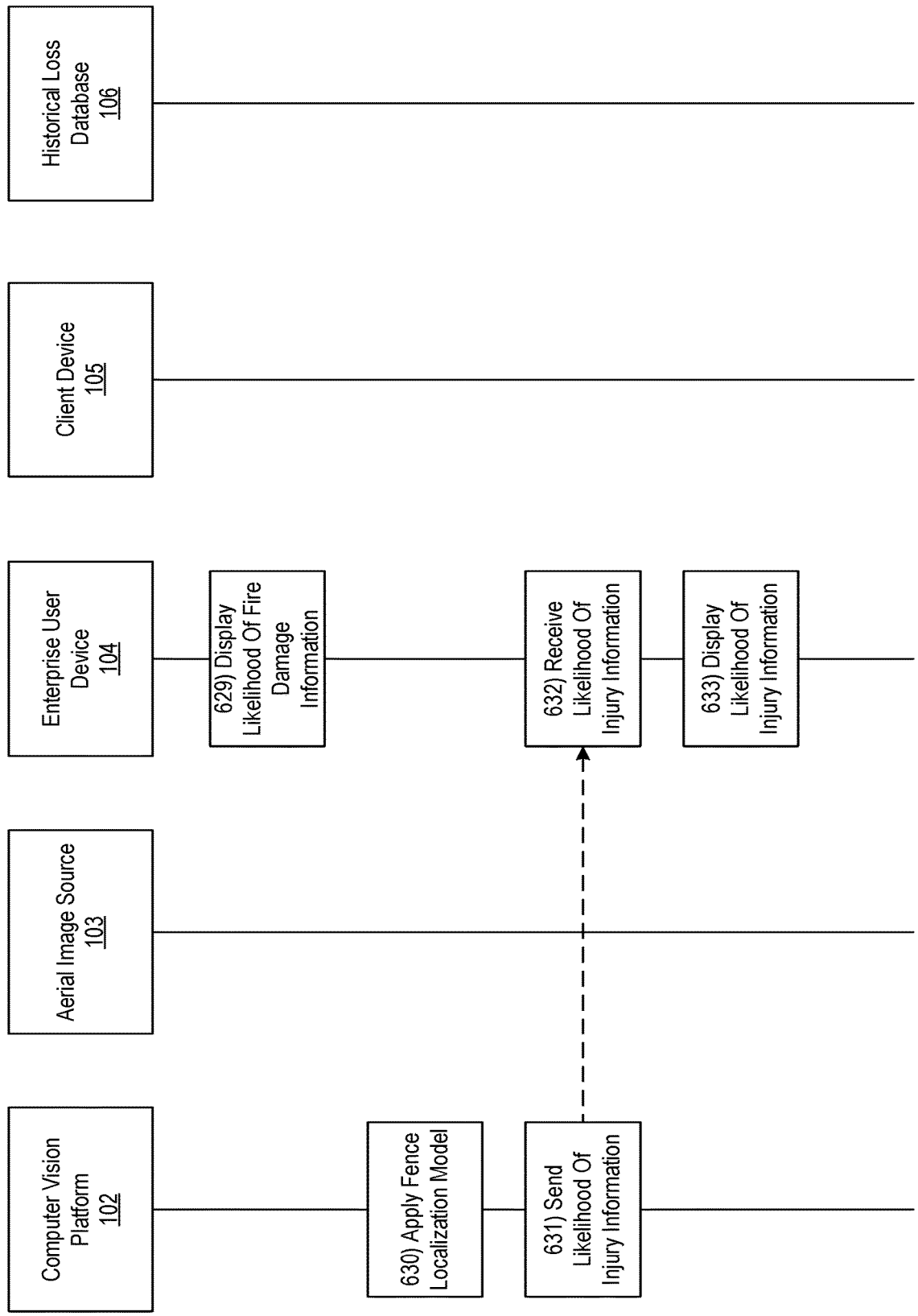

Referring to FIG. 6G, at step 629, based on or in response to the one or more commands directing the enterprise user device 104 to display the likelihood of fire damage information, the enterprise user device 104 may display the likelihood of fire damage information. For example, the enterprise user device 104 may display a graphical user interface similar to graphical user interface 1105, which is shown in FIG. 11, and which includes a predicted percent change that a home in the current image(s) may experience damage as a result of encroaching flammable brush.

At step 630, the computer vision platform 102 may apply the fence localization model (e.g., trained at step 606). For example, the computer vision platform 102 may apply the fence localization model to the current image(s), received at step 215, to identify a likelihood of injury from a property depicted in the current image(s) (e.g., based on fence locations). In doing so, the computer vision platform 102 may directly identify the likelihood of injury based on the current image(s), and may output likelihood of injury information accordingly.

In some instances, in applying the fence localization model, the computer vision platform 102 might not compare the current image(s) to the historical images. Rather, the computer vision platform 102 may perform a holistic analysis of the current image(s) using the fence localization model (which, e.g., was trained using the historical images). For example, in some instances, the current image(s) may depict a property that is not depicted in the historical images.

At step 631, the computer vision platform 102 may send the likelihood of injury information and one or more commands directing the enterprise user device 104 to display the likelihood of injury information. For example, the computer vision platform 102 may send the likelihood of injury information and one or more commands directing the enterprise user device 104 to display the likelihood of injury information via the communication interface 113 and while the third wireless data connection is established.

At step 632, the enterprise user device 104 may receive the likelihood of injury information and the one or more commands directing the enterprise user device 104 to display the likelihood of injury information. For example, the enterprise user device 104 may receive the likelihood of injury information and the one or more commands directing the enterprise user device 104 to display the likelihood of injury information while the third wireless data connection is established.

At step 633, based on or in response to the one or more commands directing the enterprise user device 104 to display the likelihood of injury information, the enterprise user device 104 may display the likelihood of injury information. For example, the enterprise user device 104 may display a graphical user interface similar to graphical user interface 1205, which is shown in FIG. 12, and which indicates a likelihood of injury that may occur on a property corresponding to the current image(s) due to fence locations.

Referring to FIG. 6H, at step 634, the computer vision platform 102 may apply the premium pricing model (trained at step 607). For example, the computer vision platform 102 may request and receive the historical pricing information (e.g., for premiums). The computer vision platform 102 may apply the premium pricing model to outputs of the various models described in FIGS. 2A-2D and 6A-6H. For example, the computer vision platform 102 use the premium pricing model to output pricing information (e.g., for premiums, or the like) based on the current image(s). For example, the computer vision platform 102 may apply the following formula: premium price=baseline price*[1+((identified roof replacement cost/average roof replacement cost)+(identified square footage/average square footage)+(likelihood of fire damage due to brush)+likelihood of injury)+(likelihood of future damage))].

At step 635, the computer vision platform 102 may send the pricing information, and one or more commands directing the enterprise user device 104 to display the pricing information, to the enterprise user device 104. For example, the computer vision platform 102 may send the pricing information and one or more commands directing the enterprise user device 104 to display the pricing information via the communication interface 113 and while the third wireless data connection is established.

At step 636, the enterprise user device 104 may receive the pricing information and the one or more commands directing the enterprise user device 104 to display the pricing information. For example, the enterprise user device 104 may receive the pricing information and the one or more commands directing the enterprise user device 104 to display the pricing information while the third wireless data connection is established.

At step 637, based on or in response to the one or more commands directing the enterprise user device 104 to display the pricing information, the enterprise user device 104 may display the pricing information. For example, the enterprise user device 104 may display a graphical user interface similar to graphical user interface 1305, which is shown in FIG. 13, and which displays a recommended price (e.g., for a homeowners premium, or the like) for a particular client or prospective client.

Figure 7:
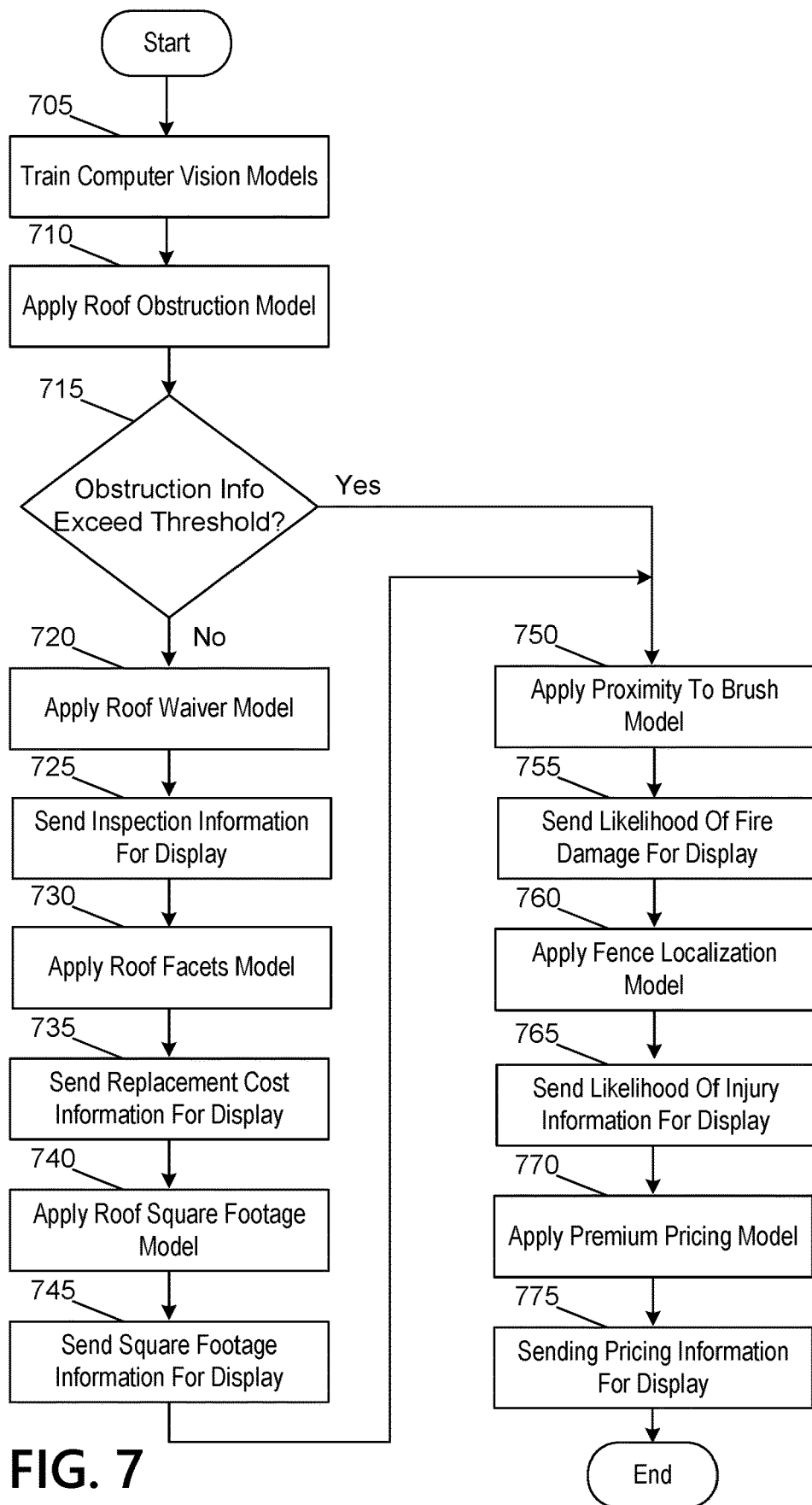
FIG. 7 depicts an illustrative method for applying computer vision methods for asset evaluation in accordance with one or more example embodiments.

FIG. 7 depicts an illustrative method for applying computer vision methods for asset evaluation in accordance with one or more example embodiments. Referring to FIG. 7, at step 705, a computing platform having at least one processor, a communication interface, and a memory may the computing platform may train one or more computer vision models, which may include a roof obstruction model, a roof waiver model, a roof facets model, a roof square footage model, a proximity to brush model, a fence localization model, and/or a pricing model. At step 710, the computing platform may apply a roof obstruction model to an image, which may result in obstruction information. At step 715, the computing platform may identify whether the obstruction information exceeds an obstruction threshold. If the obstruction information does exceed the obstruction threshold, the computing platform may proceed to step 750. If the obstruction information does not exceed the obstruction threshold, the computing platform may proceed to step 720. At step 720, the computing platform may apply a roof waiver model to the image, which may result in inspection information. At step 725, the computing platform may send the inspection information for display at an enterprise user device. At step 730, the computing platform may apply a roof facets model to the image, which may result in replacement cost information. At step 735, the computing platform may send the replacement cost information for display at the enterprise user device. At step 740, the computing platform may apply a roof square footage model to the image, which may result in roof square footage information. At step 745, the computing platform may send the roof square footage information to the enterprise computing device for display. At step 750, the computing platform may apply a proximity to brush model to the image, which may result in likelihood of fire damage information. At step 755, the computing platform may send the likelihood of fire damage information to an enterprise user device for display. At step 760, the computing platform may apply a fence localization model to the image, which may result in likelihood of injury information.

At step 765, the computing platform may send the likelihood of injury information for display at the enterprise user device. At step 770, the computing platform may apply a premium pricing model to the outputs from the previously applied models, which may result in pricing information. At step 775, the computing platform may send the pricing information to the enterprise user device for display.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing a machine learning engine and computer-readable instructions that, when executed by the at least one processor, cause the computing platform to:
   receive, from a first data source, historical images including associated metadata, the historical images comprising aerial images of a plurality of residential properties;
   extract from the associated metadata geolocation information and time information;
   receive, from a second data source, historical loss data indicating historical damage corresponding to one or more of the plurality of residential properties;
   train a neural network computer vision model using the machine learning engine, the historical images, geolocation information, time information, and the historical loss data, wherein training the neural network computer vision model configures the neural network computer vision model to output loss prediction information directly from an image using a set of rules, wherein the machine learning engine iteratively refines the neural network computer vision model and the neural network computer vision model comprises a plurality of roof models, wherein one of the plurality of roof models is a roof obstruction model, wherein the roof obstruction model is trained to determine a threshold percentage of roof obstruction considered negligent roof obstruction;
   receive, from the first data source, a new image corresponding to a particular residential property;
   preprocess the new image, using the roof obstruction model of the neural network computer vision model, to determine a percentage of roof obstruction within the new image;
   compare the percentage of roof obstruction within the new image to the threshold percentage of roof obstruction;
   determine additional roof models of the plurality of roof models to be applied to the new image based on whether the percentage of roof obstruction is less than or equal to the threshold percentage of roof obstruction;
   analyze, using the neural network computer vision model including the additional roof models of the plurality of roof models to be applied, the new image, wherein analyzing the new image directly results in output of a likelihood of future damage score based on the set of rules, wherein a reduced level of computing power is used in response to the roof obstruction being greater than the threshold percentage of roof obstruction relative to a level of computing power used in response to the percentage of roof obstruction being less than or equal to the threshold percentage of roof obstruction; and send, to an enterprise user device, likelihood of future damage information, based on the likelihood of future damage score, and one or more commands directing the enterprise user device to display the likelihood of future damage information, wherein sending the one or more commands directing the enterprise user device to display the likelihood of future damage information causes the enterprise user device to display the likelihood of future damage information.

2. The computing platform of claim 1, wherein the particular residential property is not one of the plurality of residential properties.

3. The computing platform of claim 1, wherein analyzing the new image comprises analyzing, using a holistic method, the new image.

4. The computing platform of claim 1, wherein training the neural network computer vision model comprises establishing relationships between each historical image and the historical loss data for the corresponding historical image.

5. The computing platform of claim 1, wherein the historical images comprise top down images, oblique images, color spectrum images, and near infrared images.

6. The computing platform of claim 1, wherein analyzing, using the neural network computer vision model, the new image, comprises identifying, based on foliage detected in the new image, the likelihood of damage score.

7. The computing platform of claim 1, wherein analyzing, using the neural network computer vision model, the new image, does not comprise comparing the new image to the plurality of historical images.

8. The computing platform of claim 1, wherein the memory stores additional computer-readable instructions that, when executed by the at least one processor, further cause the computing platform to:

identify, using the new image, metadata corresponding to the new image, wherein the metadata includes one or more of: a geolocation corresponding to the particular residential property or a time at which the new image was captured, wherein analyzing the new image comprises analyzing the image in context of the metadata.

9. The computing platform of claim 1, wherein:

the neural network computer vision model includes: a likelihood of future fire damage sub-model, a likelihood of future tornado damage sub-model, a likelihood of future flood damage sub-model, a likelihood of future wind damage sub-model, and a likelihood of future hail damage sub-model, analyzing the new image using the neural network computer vision model comprises applying each of the likelihood of future fire damage sub-model, the likelihood of future tornado damage sub-model, the likelihood of future flood damage sub-model, the likelihood of future wind damage sub-model, and the likelihood of future hail damage sub-model, wherein the likelihood of future damage score is a composite score based on an output from each of the likelihood of future fire damage sub-model, the likelihood of future tornado damage sub-model, the likelihood of future flood damage sub-model, the likelihood of future wind damage sub-model, and the likelihood of future hail damage sub-model.

10. A method comprising:

at a computing platform comprising at least one processor, a communication interface, and memory storing a machine learning engine:

receiving, from a first data source, historical images including associated metadata, the historical images comprising aerial images of a plurality of residential properties;

extracting from the associated metadata geolocation information and time information;

receiving, from a second data source, historical loss data indicating historical damage corresponding to one or more of the plurality of residential properties;

training a neural network computer vision model using the machine learning engine, the historical images, geolocation information, time information, and the historical loss data, wherein training the neural network computer vision model configures the neural network computer vision model to output loss prediction information directly from an image using a set of rules, wherein the machine learning engine iteratively refines the neural network computer vision model and the neural network computer vision model comprises a plurality of roof models, wherein one of the plurality of roof models is a roof obstruction model, wherein the roof obstruction model is trained to determine a threshold percentage of roof obstruction considered negligent roof obstruction;

receiving, from the first data source, a new image corresponding to a particular residential property;

preprocessing the new image, using the roof obstruction model of the neural network computer vision model, to determine a percentage of roof obstruction within the new image;

comparing the percentage of roof obstruction within the new image to the threshold percentage of roof obstruction;

determining additional roof models of the plurality of roof models to be applied to the new image based on whether the percentage of roof obstruction is less than or equal to the threshold percentage of roof obstruction;

analyzing, using the neural network computer vision model including the additional roof models of the plurality of roof models to be applied, the new image, wherein analyzing the new image directly results in output of a likelihood of future damage score based on the set of rules, wherein a reduced level of computing power is used in response to the roof obstruction being greater than the threshold percentage of roof obstruction relative to a level of computing power used in response to the percentage of roof obstruction being less than or equal to the threshold percentage of roof obstruction, and wherein analyzing, using the neural network computer vision model, the new image, does not comprise comparing the new image to the plurality of historical images; and sending, to an enterprise user device, likelihood of future damage information, based on the likelihood of future damage score, and one or more commands directing the enterprise user device to display the likelihood of future damage information, wherein sending the one or more commands directing the enterprise user device to display the likelihood of future damage information causes the enterprise user device to display the likelihood of future damage information.

11. The method of claim 10, wherein the particular residential property is not one of the plurality of residential properties.

12. The method of claim 10, wherein analyzing the new image comprises analyzing, using a holistic method, the new image.

13. The method of claim 10, wherein training the neural network computer vision model comprises establishing relationships between each historical image and the historical loss data for the corresponding historical image.

14. The method of claim 10, wherein the historical images comprise top down images, oblique images, color spectrum images, and near infrared images.

15. The method of claim 10, wherein analyzing, using the neural network computer vision model, the new image, comprises identifying, based on foliage detected in the new image, the likelihood of future damage score.

16. The method of claim 10, wherein analyzing, using the neural network computer vision model, the new image, does not comprise comparing the new image to the plurality of historical images.

17. The method of claim 10, further comprising:
identifying, using the new image, metadata corresponding to the new image, wherein the metadata includes one or more of: a geolocation corresponding to the particular residential property or a time at which the new image was captured, wherein analyzing the new image comprises analyzing the image in context of the metadata.

18. One or more non-transitory computer-readable media storing a machine learning engine and instructions that, when executed by a computing platform comprising at least one processor, a communication interface, and memory, cause the computing platform to:
receive, from a first data source, historical images including associated metadata, the historical images comprising aerial images of a plurality of residential properties;
extract from the associated metadata geolocation information and time information;
receive, from a second data source, historical loss data indicating historical damage corresponding to one or more of the plurality of residential properties;
train a neural network computer vision model using machine learning engine the historical images, geolocation information, time information, and the historical loss data, wherein training the neural network computer vision model configures the neural network computer vision model to output loss prediction information directly from an image using a set of rules, and wherein the neural network computer vision model includes: a likelihood of fire damage sub-model, a likelihood of tornado damage sub-model, a likelihood of flood damage sub-model, a likelihood of wind damage sub-model, and a likelihood of hail damage sub-model, wherein the machine learning engine iteratively refines the neural network computer vision model and the neural network computer vision model comprises a plurality of roof models, wherein one of the plurality of roof models is a roof obstruction model, wherein the roof obstruction model is trained to determine a threshold percentage of roof obstruction considered negligent roof obstruction;
receive, from the first data source, a new image corresponding to a particular residential property;
preprocess the new image, using the roof obstruction model of the neural network computer vision model, to determine a percentage of roof obstruction within the new image;
compare the percentage of roof obstruction within the new image to the threshold percentage of roof obstruction;
determine additional roof models of the plurality of roof models to be applied to the new image based on whether the percentage of roof obstruction is less than or equal to the threshold percentage of roof obstruction;
analyze, using the neural network computer vision model, the new image, wherein:
analyzing the new image directly results in output of a likelihood of damage score based on the set of rules,
a reduced level of computing power is used in response to the roof obstruction being greater than the threshold percentage of roof obstruction relative to a level of computing power used in response to the percentage of roof obstruction being less than or equal to the threshold percentage of roof obstruction,
analyzing the new image comprises applying each of the additional roof models, likelihood of future fire damage sub-model, the likelihood of future tornado damage sub-model, the likelihood of future flood damage sub-model, the likelihood of future wind damage sub-model, and the likelihood of future hail damage sub-model, and
the likelihood of future damage score is a composite score based on an output from each of the likelihood of future fire damage sub-model, the likelihood of future tornado damage sub-model, the likelihood of future flood damage sub-model, the likelihood of future wind damage sub-model, and the likelihood of future hail damage sub-model; and
send, to an enterprise user device, likelihood of future damage information, based on the likelihood of future damage score, and one or more commands directing the enterprise user device to display the likelihood of future damage information, wherein sending the one or more commands directing the enterprise user device to display the likelihood of future damage information causes the enterprise user device to display the likelihood of future damage information.

19. The computing platform of claim 1, wherein the roof obstruction model determines the threshold percentage of roof obstruction iteratively based on an accuracy of the likelihood of future damage scores of a plurality of previously processed images.

* * * * *